US008897161B2

(12) United States Patent (10) Patent No.: US 8,897,161 B2
Fujishima et al. (45) Date of Patent: Nov. 25, 2014

(54) WIRELESS COMMUNICATION SYSTEM AND BASE STATION

(75) Inventors: Kenzaburo Fujishima, Yokohama (JP); Tsuyoshi Tamaki, Machida (JP); Rintaro Katayama, Fujisawa (JP); Hitoshi Ishida, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 129 days.

(21) Appl. No.: 13/545,386

(22) Filed: Jul. 10, 2012

(65) Prior Publication Data

US 2013/0070625 A1 Mar. 21, 2013

(30) Foreign Application Priority Data

Sep. 16, 2011 (JP) .................................. 2011-203534

(51) Int. Cl.
*H04L 12/58* (2006.01)
*H04W 36/20* (2009.01)
*H04W 36/08* (2009.01)

(52) U.S. Cl.
CPC .............. *H04W 36/20* (2013.01); *Y02B 60/50* (2013.01); *H04W 36/08* (2013.01)
USPC ........................................................ 370/252

(58) Field of Classification Search
CPC .................... H04W 36/0083; H04W 52/243
See application file for complete search history.

(56) References Cited

U.S. PATENT DOCUMENTS

| | | | |
|---|---|---|---|
| 2009/0161619 A1 | 6/2009 | Noma | |
| 2009/0181664 A1* | 7/2009 | Kuruvilla et al. | 455/423 |
| 2009/0310568 A1 | 12/2009 | Chen et al. | |
| 2009/0312024 A1 | 12/2009 | Chen et al. | |
| 2010/0088410 A1* | 4/2010 | Ridley | 709/224 |
| 2011/0051686 A1* | 3/2011 | Lee et al. | 370/331 |
| 2011/0201341 A1* | 8/2011 | Choudhury et al. | 455/450 |
| 2011/0211560 A1 | 9/2011 | Yamamoto et al. | |
| 2013/0012259 A1* | 1/2013 | Furuskar et al. | 455/522 |

FOREIGN PATENT DOCUMENTS

| | | | |
|---|---|---|---|
| JP | 2009-152826 A | 7/2009 | |
| JP | 2009-303223 A | 12/2009 | |
| JP | 2011-182009 A | 9/2011 | |

OTHER PUBLICATIONS

"Intra E-UTRAN"; 3GPP TS 36.300 V10.3.0 (Mar. 2011), Release 10, pp. 60-91.
"Handover Signalling Messages"; 3GPP TS 36.413 V9.1.0 (Dec. 2009), Release 9, pp. 75-82.
"X2AP Procedures"; 3GPP TS 36.423 V9.1.0 (Dec. 2009), Release 9, pp. 12-32.

(Continued)

*Primary Examiner* — John Blanton
(74) *Attorney, Agent, or Firm* — Foley & Lardner LLP

(57) ABSTRACT

To reduce an uplink interference in a network with a first base station of a large output and a second base station of a small output. Detecting the interference, the second base station urges the first base station to hand over a terminal causing it to the second base station. Multiple base stations and one or more terminals exist in this system, each terminal connects with one base station, and a serving base station is changed according to a communication state of each terminal. If the different second base station other than the first base station to which the terminal connects detects a large interference, the second base station will multicast transmit information for urging handover to the base stations except itself. The base station having received the information specifies a terminal giving the interference to the second base station, and makes it to be handed over thereto.

12 Claims, 17 Drawing Sheets

(56) References Cited

OTHER PUBLICATIONS

"Reception of an RRCConnectionReconfiguration including the mobilityControlInfo by the UE (handover)"; 3GPP TS 36.331 V10.0.0 (Dec. 2010), Release 10, pp. 47-49; 119-120; 191-192.

"MAC Procedures"; 3GPP TS 36.321 V10.0.0 (Dec. 2010), Release 10, pp. 12-17.

"Connection Mobility Control (CMC)"; 3GPP TS 36.300 V10.3.0 (Mar. 2003), Release 10, pp. 119-120.

"Coordinated multiple point transmission and reception"; 3GPP TR 36.814 V9.0.0 (Mar. 2010), Release 9, pp. 15-19.

* cited by examiner

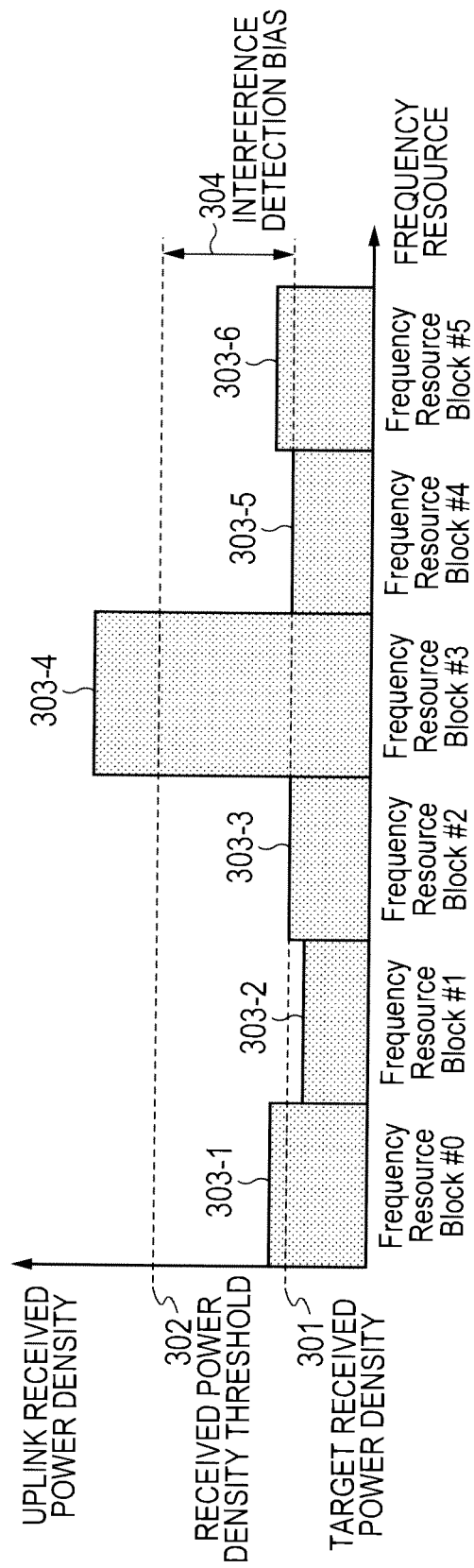

FIG. 8A

| | | |
|---|---|---|
| 401 | Source Cell ID | 64 |
| 402 | Subframe Number | 430 |
| 403 | Measurement Duration [subframes] | 12 |
| 404 | High Interference Cycle [subframes] | 2 |
| 405 | High Interference Subframe Offset [subframes] | 0 |
| 406 | High Interference Resource Block Offset [RBs] | 4 |
| 407 | High Interference Resource Block Shift [RBs] | 6 |
| 408 | Measurement Object | Data |

FIG. 8B

| | | |
|---|---|---|
| 401 | Source Cell ID | 0, ..., 511 |
| 402 | Subframe Number | 0, ..., 2^32-1 |
| 403 | Measurement Duration [subframes] | enumerated {4, 8, 12, 16, 20, 24, 28, 32, 36, 40, 44, 48, 52, 56, 60, 64} |
| 404 | High Interference Cycle [subframes] | 1, 2, ..., Measurement Duration |
| 405 | High Interference Subframe Offset [subframes] | 0, 1, ..., Measurement Duration-1 |
| 406 | High Interference Resource Block Offset [RBs] | 0, 1, ..., NUMBER_OF_RESOURCE_BLOCK |
| 407 | High Interference Resource Block Shift [RBs] | 0, 1, ..., NUMBER_OF_RESOURCE_BLOCK |
| 408 | Measurement Object | choice {Data, Reference} |

FIG. 10A

| Source Cell ID (501) | High Interference Cycle (502) | High Interference Subframe Offset (503) | High Interference Resource Block Offset (504) | High Interference Resource Block Shift (505) | Measurement Object (506) |
|---|---|---|---|---|---|
| 64 | 2 | 0 | 4 | 6 | Data |

FIG. 10B

| Frequency Resource Index (507) | Subframe Offset #0 (508-1) | Subframe Offset #1 (508-2) | Subframe Offset #2 (508-3) | Subframe Offset #3 (508-4) |
|---|---|---|---|---|
| 7 | uid = 0 | uid = 8 | uid = 5 | uid = 13 |
| 6 | uid = 1 | uid = 9 | uid = 1 | uid = 9 |
| 5 | uid = 2 | uid = 10 | uid = 4 | uid = 12 |
| 4 | uid = 3 | uid = 11 | uid = 0 | uid = 8 |
| 3 | uid = 4 | uid = 12 | uid = 7 | uid = 15 |
| 2 | uid = 5 | uid = 13 | uid = 3 | uid = 11 |
| 1 | uid = 6 | uid = 14 | uid = 6 | uid = 14 |
| 0 | uid = 7 | uid = 15 | uid = 2 | uid = 10 |

509-1, 509-2 uid: User equipment ID

FIG. 11A

| Source Cell ID (501) | High Interference Cycle (502) | High Interference Subframe Offset (503) | High Interference Resource Block Offset (504) | High Interference Resource Block Shift (505) | Measurement Object (506) |
|---|---|---|---|---|---|
| 64 | 2 | 0 | 4 | 6 | Reference |

FIG. 11B

| User Equipment ID (510) | Transmission Cycle [subframe] (511) | Subframe Offset [subframe] (512) | Resource Block Offset (513) | Resource Block Shift (514) |
|---|---|---|---|---|
| 0 | 2 | 0 | 0 | 6 |
| 1 | 2 | 0 | 1 | 6 |
| 2 | 2 | 0 | 2 | 6 |
| 3 | 2 | 0 | 4 | 6 |
| 4 | 2 | 1 | 0 | 6 |
| 5 | 2 | 1 | 1 | 6 |
| 6 | 2 | 1 | 2 | 6 |
| 7 | 2 | 1 | 4 | 6 |
| 8 | 4 | 0 | 0 | 3 |
| 9 | 4 | 0 | 4 | 3 |
| 10 | 4 | 1 | 0 | 3 |
| 11 | 4 | 1 | 4 | 3 |
| 12 | 4 | 2 | 0 | 3 |
| 13 | 4 | 2 | 4 | 3 |
| 14 | 4 | 3 | 0 | 3 |
| 15 | 4 | 4 | 4 | 3 |

(515 indicates row with User Equipment ID = 3)

| | uid = 0 | uid = 1 | uid = 2 | uid = 3 |
|---|---|---|---|---|
| LARGE COVERAGE BASE STATION 1-1 (Serving) | −100 [dBm] | −100 [dBm] | −70 [dBm] | −90 [dBm] |
| LARGE COVERAGE BASE STATION 1-2 (Neighbor) | −95 [dBm] | −130 [dBm] | −160 [dBm] | −140 [dBm] |
| SMALL COVERAGE BASE STATION 2-2 (Neighbor) | −150 [dBm] | −95 [dBm] | −140 [dBm] | −95 [dBm] | uid: User equipment ID

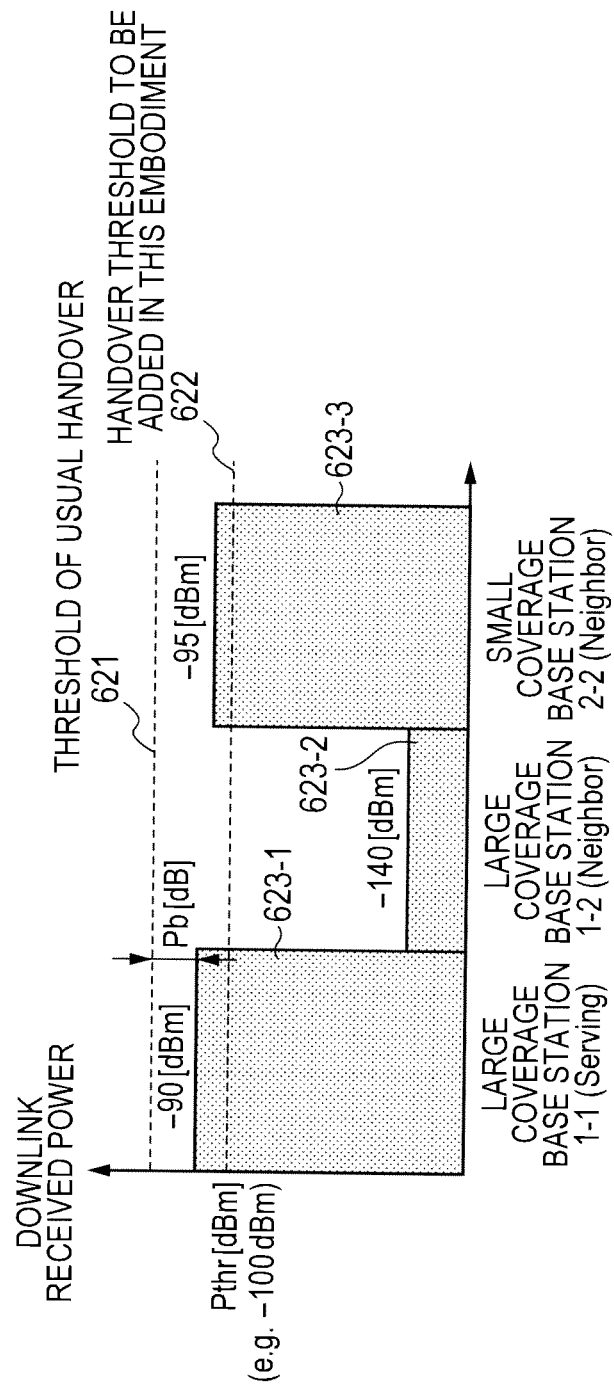

WIRELESS COMMUNICATION SYSTEM AND BASE STATION

CLAIM OF PRIORITY

The present application claims priority from Japanese Unexamined Patent Application Publication No. 2011-203534 filed on Sep. 16, 2011, the contents of which is hereby incorporated by reference into this application.

BACKGROUND

The present invention relates to a wireless communication system and abase station, and more specifically, to a wireless communication system that urges a handover processing of a mobile terminal of interference source in a heterogeneous network where a base station whose output is large and a base station whose output is small exist together.

As a background art of this technical field, there is LTE (Long Term Evolution) that is a cellular system to which OFDMA (Orthogonal Frequency Division Multiple Access)-MIMO (Multiple Input Multiple Output) technology is applied, which has already come to a stage of service-in in some countries.

In the cellular system in recent years, not only a large coverage and large output macro base station that was formerly a mainstream but also smaller coverage and smaller output pico base station and femto base station increase in number, which are used for a use of covering a coverage hole of the macro base station and a use of shifting a terminal connecting to the macro base station to a small coverage base station apparatus side by placing it in an area where the data traffic is locally high, called a hot spot, namely a use for traffic offloading.

A network where the large coverage base station and the small coverage base station exist together is termed a heterogeneous network. As a problem peculiar to the heterogeneous network, a downlink cell edge and an uplink cell edge may not be in coincidence with each other. Generally, regarding the cell edges formed between the large coverage base station and the small coverage base station, the uplink cell edge is located near the large coverage base station compared to the downlink cell edge. In the LTE, since the terminal connects to the base station such that a downlink received power therefrom is high, the terminal in the downlink cell edge connecting to the large coverage base station will transmit an uplink signal at a position nearer the small coverage base station than that in the uplink cell edge. As a result, it will transmit an uplink interference signal whose received power is large to the small coverage base station located in the neighborhood of the terminal.

Japanese Unexamined Patent Application Publication No. 2009-303223 discloses one of methods for solving this problem. This patent literature presents, in summary, that the small coverage base station detects the terminal connecting to the large coverage base station that may exert an interference of high power to the small coverage base station, and notifies detected information to the large coverage base station to urge it to perform handover to the small coverage base station.

A handover related processing in the LTE is disclosed, for example, in (1) 3GPP, "Evolved Universal Terrestrial Radio Access (E-UTRA) and Evolved Universal Terrestrial Radio Access Network (E-UTRAN); Overall description; Stage 2 (Release 10)," TS36.300, pp. 60-91, v 10.3.0, 2011/3, (2) 3GPP, "Evolved Universal Terrestrial Radio Access Network (E-UTRAN); S1 Application Protocol (S1AP) (Release 9)," TS36.413, pp. 75-82, v 9.1.0, 2009/12, (3) 3GPP, "Evolved Universal Terrestrial Radio Access Network (E-UTRAN); X2 Application Protocol (X2AP) (Release 9)," TS36.423, pp. 12-17 and 27-32, v 9.1.0, 2009/12, (4) 3GPP, "Evolved Universal Terrestrial Radio Access (E-UTRA); Radio resource Control (RRC); Protocol Specification (Release 10)," TS36.331, pp. 47-49, pp. 119-120, pp. 191-192, v 10.0.0, 2010/12, and (4) 3GPP, "Evolved Universal Terrestrial Radio Access (E-UTRA); Medium Access Control(MAC) protocol specification (Release 10)," TS36.321, pp. 12-17, v 10.0.0, 2010/12. An outline of a handover method described in 3GPP, "Evolved Universal Terrestrial Radio Access (E-UTRA) and Evolved Universal Terrestrial Radio Access Network (E-UTRAN); Overall description; Stage 2 (Release 10)," TS36.300, pp. 60-91, v 10.3.0, 2011/3 will be explained. In the explanation, it is premised that the terminal is connecting to the large coverage base station, the small coverage base station exists in the neighborhood of the terminal, and the terminal is to be moved to the small coverage base station from the large coverage base station.

As preliminary preparation before performing the handover, the large coverage base station configure the terminal to measure the downlink received power about the large coverage base station and the neighbor base stations, i.e., the small coverage base stations in the case explained here, and report it. The terminal feeds back a measurement result of the downlink received power to the large coverage base station according to a configuration result. The large coverage base station refers to feedback information coming from the terminal, and if the downlink received power that is the downlink received power about the small coverage base station added with the a predetermined bias becomes larger than the downlink received power about the neighbor large coverage base station, it will start the handover processing of the terminal to the small coverage base station.

In the handover processing, first, the large coverage base station issues a Handover Request to the small coverage base station that becomes a destination of the terminal. If an ACK comes back from the small coverage base station, a Handover command will be transmitted to the terminal so that the terminal shall move to the small coverage base station. Upon reception of the Handover command, the terminal performs downlink reception timing synchronization and an initial access operation to the small coverage base station described in the Handover command. Subsequently, the small coverage base station gives a terminal ID that is distributed locally within the small coverage base station, and preparation of data communication is completed on the radio side. On the other hand, in order to hand over the data communication of the terminal between the base stations, a Sequence Number given to a data signal is handed over between the base stations. Moreover, since it is necessary to know which base station takes a control of the terminal when seeing it from a network host side, information on the original base station and the destination base station of the terminal is reported to a Mobility Management Entity (MME) from the base stations that are involved in the handover.

SUMMARY

The heterogeneous network where a large coverage base station whose output is comparatively large and a small coverage base station whose output is comparatively small exist together has a problem that geographical positions of a cell edge in downlink communication and a cell edge in uplink communication differ from each other. The problem causes the following phenomena. When the terminal that chose the large coverage base station as a serving base station on the basis of the downlink received power is located in such a way that a distance to the large coverage base station when seeing from the terminal is further than a distance to the small coverage base station, that is, the terminal is located in the neighborhood of the small coverage base station, if power control is performed so that the terminal may be able to receive it with a target received power to the large coverage base station, a large uplink interference power exceeding the target received power will occurs in the small coverage base station located in the neighborhood of the terminal. This large uplink interference power exerts an adverse effect, such as a throughput fall and communication disconnection, on the uplink communication of the terminal connecting to the small coverage base station. An object of the present invention is to reduce the adverse effect that this large uplink interference power brings about.

A technology having the same object is disclosed in Japanese Unexamined Patent Application Publication No. 2009-303223, for example. According to this patent literature, the small coverage base station does not allocate a communication resource to any terminal, provides a zero section where only a reception observation operation is performed, and monitors the received power of an uplink signal transmitted by the terminal connecting to the large coverage base station in the section. Disclosed is a technology whereby upon reception of a large received power, the small coverage base station specifies a source terminal of the signal, notifies information that specifies the source terminal to the large coverage base station to which the source terminal connects, and urges the large coverage base station to perform a handover processing to the small coverage base station.

However, this patent literature takes an approach whereby the large coverage base station notifies parameters related to the source terminal to the small coverage base station in advance, and the small coverage base station tries to specify the source terminal based on the notified parameters. Since this method requires information related to a large number of terminals that do not exert interferences to the small coverage base station to be sent in advance, this method comes with a problem that a communication traffic volume between the large coverage base station and the small coverage base station that is necessary to achieve the above-mentioned object becomes huge. This problem is none of the problems to be solved by the present invention.

In view of the above respects, the present invention has an object to provide a wireless communication system that can reduce the uplink interference to the base station whose output is comparatively low while suppressing communication between the base stations and can stabilize radio communication of a terminal connecting to the base station in a wireless communication system where the base station whose output is large and the base station whose power is small exist together, and a base station thereof.

The problem is solved by a wireless communication system in which multiple base stations and one or more terminals exist, each terminal connects with one base station and that performs changing of a serving base station according to a communication state of each terminal, namely so-called handover, characterized in that a second base station other than a first base station to which the terminal connects multicast transmits information for urging the handover to the multiple base stations except the second base station.

According to the first aspect of the present invention, there is provided a wireless communication system that has multiple base stations including the first base station with which the terminal comminutes and the second base station to which a radio signal transmitted from the terminal becomes an interference power, and that can perform handover of the terminal from the first base station to the second base station, in which upon detection of the interference power being more than or equal to a previously set threshold, the second base station multicast transmits the information for urging the handover to multicast receiver base stations that include the first base station and are at least a part of the multiple base stations, and the multicast receiver base station that received the information specifies a terminal that is inferred to exert the interference to the second base station being a multicast source among the terminals connecting to the local base station, and performs the handover processing to the terminal.

According to the second aspect of the present invention, there is provided a base station in the wireless communication system that has multiple base stations including the first base station with which the terminal communicates and the second base station to which the radio signal transmitted from the terminal becomes an interference power, including: an interference power measuring part that inputs therein the radio signal transmitted from the terminal and measures a received power density for each predetermined unit time and for each predetermined frequency; and a multicast transmission part that upon detection of the received power density being more than or equal to the previously set threshold, specifies a terminal that is inferred to exert the interference to the local base station, and multicast transmits the information for urging the handover.

According to the third aspect of the present invention, there is provided a base station in the wireless communication system that has multiple base stations including the first base station with which the terminal communicates and the second base station to which the radio signal transmitted from the terminal becomes an interference power and can perform handover of the serving base station of the terminal, having; a mobile-terminal-of-interference-source specifying part that receives information that is multicast transmitted from the second base station having detected an interference power being more than or equal to the previously set threshold and specifies a terminal that is inferred to exert the interference to the second base station of the multicast source among the terminals connecting to the local base station; and a handover processing part that performs the handover processing about the terminal that was specified by the mobile-terminal-of-interference-source specifying part.

According to the aspects of the present invention, there is provided the wireless communication system where the base station whose output is large and the base station whose output is small exist together, in which it is possible to reduce the uplink interference to the base station whose output is comparatively low while suppressing communication between the base stations, and to stabilize the radio communication of the terminal connecting to the base station.

BRIEF DESCRIPTION OF THE DRAWINGS

FIG. 6 is a method for detecting a large interference received power in the small coverage base station according to this embodiment;

FIG. 8A is one example of a multicast message of the interference generation rule information according to this embodiment;

FIG. 8B is an example of a protocol specification of the multicast message of the interference generation rule information according to this embodiment;

FIG. 10A is a first example of the interference generation rule information that the large coverage base station receives in a multicast manner according to this embodiment;

FIG. 10B is an example of log creation of uplink radio resource allocation in the large coverage base station and one example of a collation processing of the received interference generation rule information and the allocation log according to this embodiment;

FIG. 11A is a second example of the interference generation rule information that the large coverage base station receives in a multicast manner according to this embodiment;

FIG. 11B is an example of a method for recording the uplink reference signal configuration information in the large coverage base station and one example of the collation processing of the received interference generation rule information and the configuration information according to this embodiment;

FIG. 13 is an example of a handover execution determination method in the large coverage base station according to this embodiment;

DETAILED DESCRIPTION

First Embodiment

Figure 1:
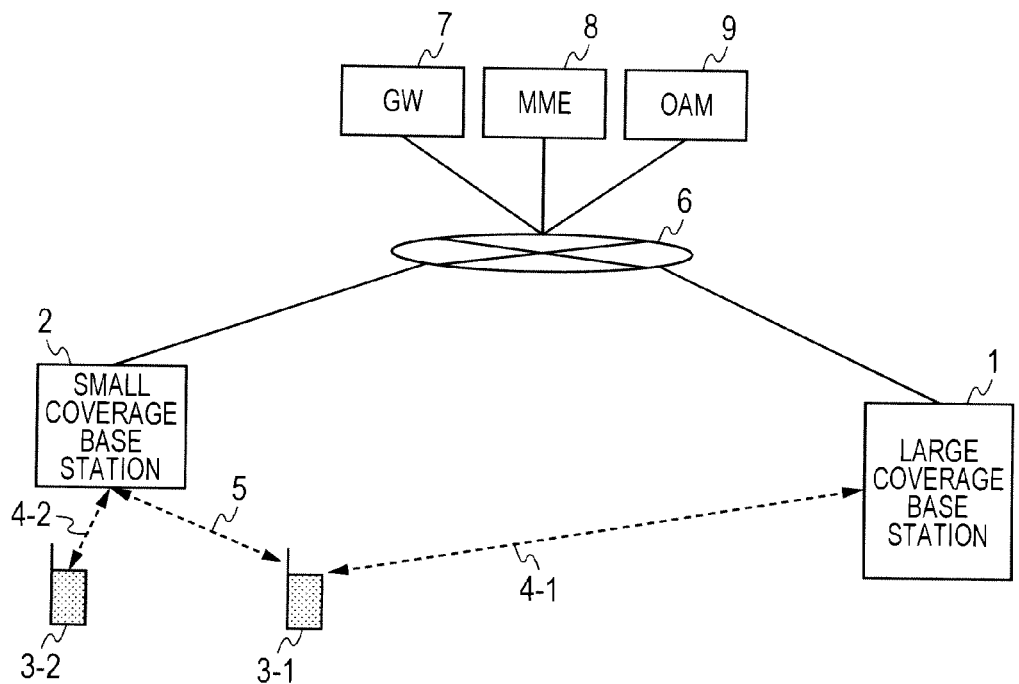
FIG. 1 is one example of a system configuration of this embodiment.

FIG. 1 shows one example of a system configuration of this embodiment. As a base station apparatus of a wireless communication system, the system has a large coverage base station (a first base station) 1 whose transmission power is comparatively large, and a small coverage base station (a second base station) 2 whose power is comparatively small, in which, for example, a terminal 3-1 establishes a connection to the large coverage base station 1 and a terminal 3-2 establish connections to the large coverage base station 1 and the small coverage base station 2, respectively, which enables data communications (4-1, 4-2) to be performed. The data communication 4-1 between the terminal 3-1 and the large coverage base station 1 serves as an interference signal 5 to the small coverage base station 2. Incidentally, in this embodiment, the larger the difference between the base station apparatuses, the more obvious the problem to be solved by this embodiment becomes, and therefore the large coverage base station 1 and the small coverage base station 2 are differentiated by the transmission power. However, the transmission powers of the both base stations may be the same. Each of the large coverage base station 1 and the small coverage base station 2 is connected with a gateway device 7, an MME (Mobility Management Entity) device (position management device) 8, and an OAM (Operation and Maintenance) device (maintenance and operation device) 9 through a backhaul network 6. The gateway device 7 is a terminating device of a radio access network including each base station apparatus and the backhaul network 6, and controls the data communication between each terminal 3 and a node outside the radio access network.

The MME device 8 has a position management function of the terminal 3, and when the terminal 3 makes handover extending over the base station apparatuses, it updates a position of the terminal 3. By managing the position of the terminal 3 sequentially, the data being flown from the gateway device 7 to each base station apparatus is controlled so that its destination may trace the position of the terminal 3.

The OAM device 9 has a function of setting operation parameters to each base station apparatus, and a function of collecting measurement data, such as a throughput of the base station apparatus and the terminal and received field intensity, from each base station apparatus and updating the above-mentioned operation parameters. Although the OAM device 9 is being connected to the backhaul network 6 that is a management range of the gateway device 7 in FIG. 1, the OAM device 9 may exist outside the gateway device 7, i.e., on a core network side, or on another network connected therefrom through the core network. In this embodiment, attention should be paid to a function of transmitting, for example, a list of other base stations located in the neighborhood of each base station apparatus, i.e., a neighbor list, among functions that the OAM device 9 has.

Before explaining an operating sequence of FIG. 3, the problem to be solved by this embodiment will be explained more concretely using FIG. 2.

A horizontal axis shows positions of the terminal and base station apparatuses, and the left end shows a position of the small coverage base station 2 whose transmission power is small, and the right end shows a position of the large coverage base station 1 whose transmission power is large. A vertical axis shows an uplink or downlink received power at a position of the horizontal axis. The uplink received power shows the received power at each base station apparatus, and the downlink received power shows the received power at the terminal 3.

First, attention is paid to the downlink received power. A downlink received power 103 of the signal transmitted from the large coverage base station 1 is high near the large coverage base station 1, and decreases with increasing distance from the large coverage base station 1 due to propagation attenuation. Similarly, a downlink received power 104 of the signal transmitted from the small coverage base station 2 is high near the large coverage base station 2, and decreases with increasing distance from the small coverage base station 2 due to the propagation attenuation. A fact that the large coverage base station 1 and the small coverage base station 2 have different start points in the vertical axis indicates a difference between their transmission powers. Points at which the received powers of the signals transmitted from both base stations are balanced form a region that is termed a so-called cell edge 105. Since the terminal 3 is connected to either one of the base stations, a sending signal from the other base station acts as a serious interference source. Therefore, the cell edge 105 can become a region where a radio communication quality is the worst.

Next, attention is paid to the uplink received power. The terminal 3 is assumed to be located on the cell edge 105. The terminal 3 controls its transmission power so that a base station apparatus to which the terminal 3 connects can receive with a target received power 106. Concretely, the terminal 3 measures the received power of the reference signal transmitted from the base station apparatus to which the terminal 3 connect, and estimates a propagation loss from information of the transmission power of the serving base station apparatus that is notified separately. By biasing the above-mentioned target received power with the estimated propagation loss, the transmission signal from the terminal 3 is received by the serving base station apparatus with the target received power 106 ideally. In an example of FIG. 2, although the target received powers 106 of the large coverage base station 1 and the small coverage base station 2 are assumed to be the same, they may differ from each other.

First, consider a case where the terminal 3 located on the cell edge 105 is connecting to the small coverage base station 2. At this time, the terminal 3 controls its transmission power so that the small coverage base station 2 can receive with the target received power 106 (108). Then, the small coverage base station 2 receives with the target received power 106, and the received power at the large coverage base station 1 located far away from the small coverage base station 2 when seeing from the terminal becomes considerably lower than the target received power 106 of the large coverage base station 1. Since the sending signal from the terminal 3 becomes an interference to the large coverage base station 1, it is desirable that the sending signal from the terminal 3 is much lower than the target received power 106.

On the other hand, consider a case where the terminal 3 located at the cell edge 105 is connecting to the large coverage base station 1. At this time, the terminal 3 controls its transmission power so that the large coverage base station 1 can receive with the target received power 106 (107). Then, although the sending signal from the terminal 3 is received with the target received power 106 by the large coverage base station 1, in the small coverage base station 2 located in the nearer neighborhood when seeing from the terminal 3, the signal is received with a power far exceeding the target received power 106. For the small coverage base station 2, the sending signal from the terminal 3 connecting to the large coverage base station 1 is an interference, and this phenomenon will cause occurrence of an interference whose level is higher than a desired signal received with around the target received power 106. Solving this interference problem in uplink communication is a problem of this embodiment.

Figure 2:
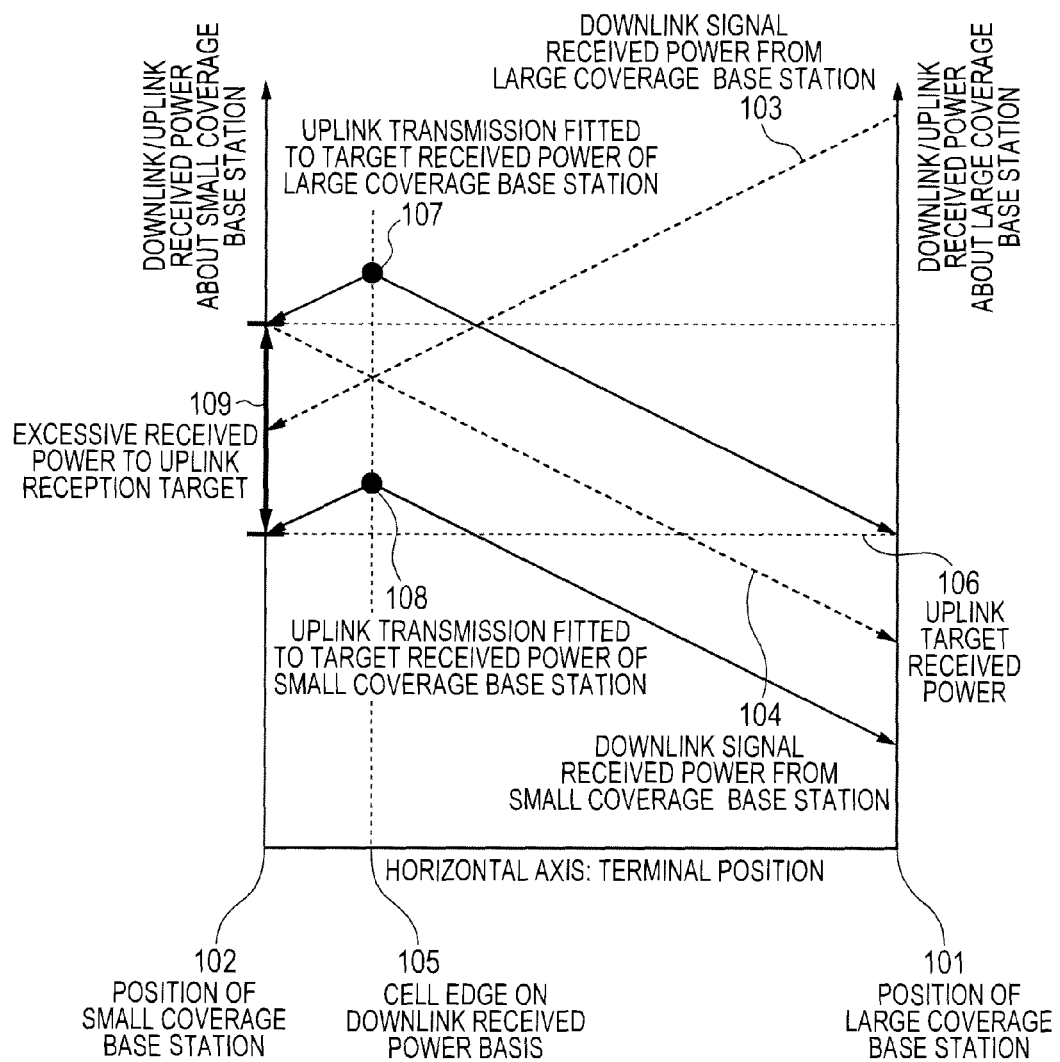
FIG. 2 is an explanatory diagram of a problem that is intended to be solved.

Incidentally, although shadowing and a difference of a propagation loss between the base stations are not considered in the example of FIG. 2, taking these influences into consideration, the similar problem will occur even if the broth base station apparatuses have the same transmission power.

Figure 3:
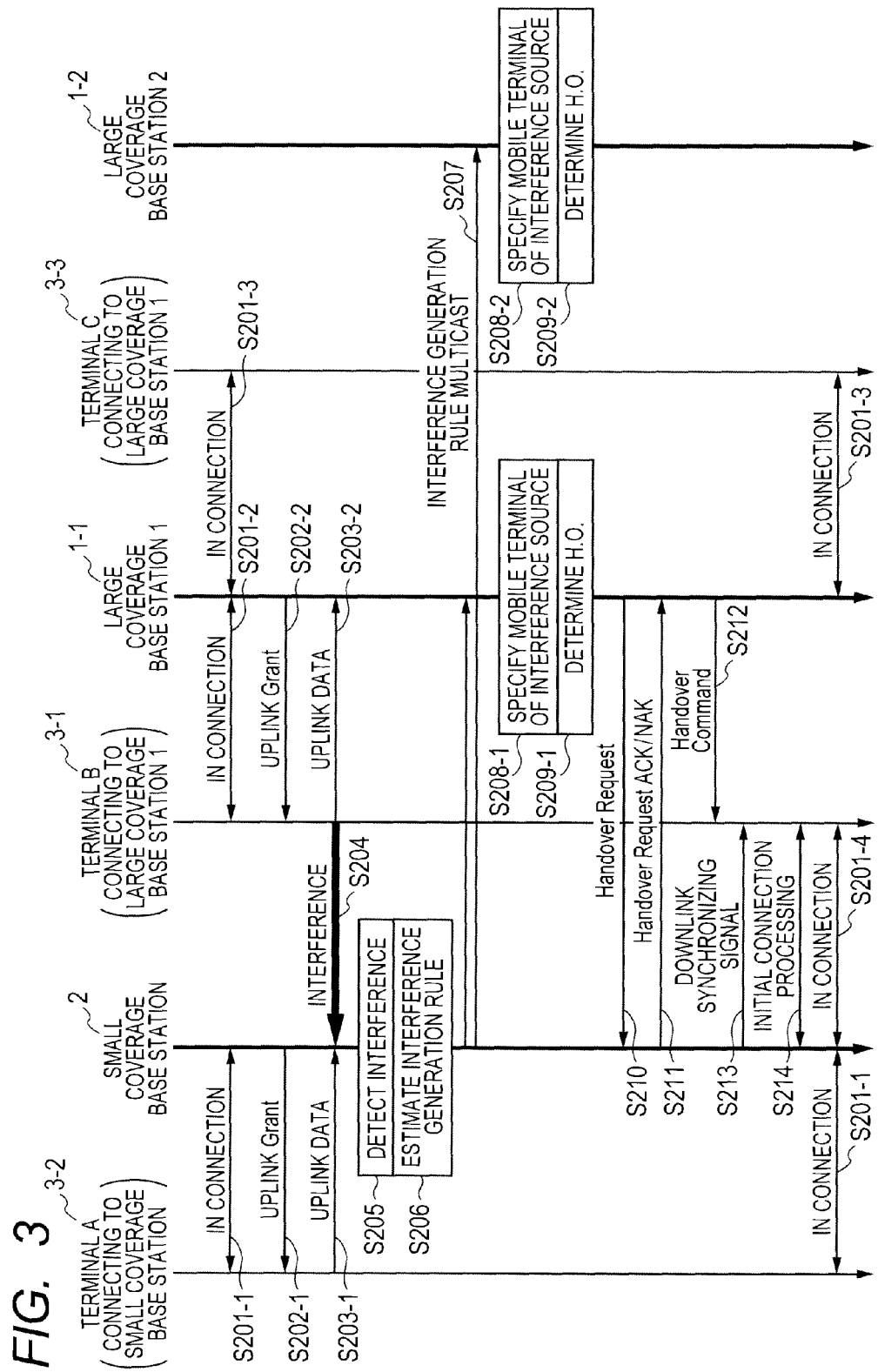
FIG. 3 is an operating sequence diagram of the whole system according to this embodiment.

FIG. 3 shows an operating sequence diagram of the whole system according to this embodiment. In this example, the system considers the small coverage base station 2 and two large coverage base stations (1-1 and 1-2) as the base station apparatuses, and considers a terminal A (3-2) connecting to the small coverage base station 2, a terminal B (3-1) and a terminal C (3-3) connecting to the large coverage base station 1-1 as the terminals. Although the terminal 3 is not connecting to the large coverage base station 1-2, this is placed to show a reception destination of the multicast transmission (S207) from the small coverage base station 2 according to this embodiment exists besides the large coverage base station 1-1. The terminal A (3-2) has established a connection (S201-1) with the small coverage base station 2, and the terminal B (3-1) and the terminal C (3-3) have established connections (S201-2, S201-3) with the large coverage base station 1 (1-1). In this state, uplink Grants (S202-1, S202-2) that are transmission permissions are received by the terminal A from the small coverage base station 2 and by the terminal B from the large coverage base station 1-1, respectively. The terminal A and the terminal B that received the uplink Grants transmit uplink data (S203-1, S203-2), respectively, after a fixed period of time promised by a protocol after the reception. Although the uplink data interferes mutually at this time, in this embodiment, attention is paid to an interference (S204) from the terminal B to the small coverage base station 2.

The small coverage base station 2 monitors an uplink interference power for every uplink transmission time interval (TTI) from the terminal, and tries to detect the interference power being more than or equal to a previously set threshold (S205). For example, an electric power received from a terminal other than the terminal connecting to the local base station can be designated as the interference power. Upon detection of the interference power being more than or equal to the threshold, the small coverage base station 2 continues to monitor this, and estimates on which time and frequency rule (interference generation rule) the interference power being more than or equal to the threshold occurs (S206). For example, information of a time and information of a frequency (subframe information) at which the interference power being more than or equal to the threshold is detected during a previously set time of monitoring are stored, and the interference generation rule is estimated based on the stored data. The small coverage base station 2 multicast transmits the interference generation rule that the small coverage base station 2 inferred in Step S206 to neighbor base stations, i.e., the large coverage base station 1 (1-1) and the large coverage base station 2 (1-2) in FIG. 3, referring to a list of the neighbor base stations being set by the OAM device 9, i.e., the neighbor list (S207).

Each of the neighbor base stations of the small coverage base station 2 that receive multicast information, i.e., the large coverage base station 1 (1-1) and the large coverage base station 2 (1-2), tries to specify the terminal that exerts an interference of high power to the small coverage base station 2 and is under the control of the local base station 2 (S208-1, S208-2). In specifying the terminal, each of the large coverage base station 1 (1-1) and the large coverage base station 2 (1-2) collates between the uplink resource allocation past result (history) to the own terminal and information about the interference generation rule received by means of multicast, going back to the past from the time of receiving the multicast information. If the uplink resource allocation past result to a certain terminal connecting to the local base station and the interference generation rule received by means of the multicast coincide with each other, each neighbor base station (here each large coverage base station) specifies that the terminal is a high power interference source to the small coverage base station 2, if the interference generation rule does not coincide with the uplink resource allocation past result of any terminal, it judges that a relevant terminal does not exist. Incidentally, in other cases than the case of complete coincidence, a terminal having a difference within a previously set tolerance may be allowed. For example, it is all right to judge whether the difference is within the above-mentioned tolerance according to an index obtained by a rule that is previously set based on the uplink resource allocation past result and the interference generation rule.

Handover determinations (S209-1, S209-2) that are in a later stage of mobile terminal of interference source specifications (S208-1, S208-2) include two kinds of processings, the handover determination by this embodiment and the conventional handover determination.

In the handover determination by this embodiment, when a mobile terminal of interference source specified in S208 is handed over to the small coverage base station 2 that is a destination to which the interference is exerted, it is determined whether it does not hamper its downlink communication quality, and if it causes no hamper, a determination that the handover be performed on the terminal will be made. Although this embodiment is an embodiment where the handover is urged upon detection of the large uplink interference power, if a serving base station of the mobile terminal of interference source is determined only by the uplink received power, the handover will be performed without slightest consideration of the received power at the terminal; as a result, there may be a case where, when the terminal tries to switch the serving base station, the terminal falls into incapability of connection. In order to avoid this problem, it shall be determined whether the terminal that was chosen on the basis of the uplink power in S208 is made to be handed over without causing any problem also in terms of the downlink communication quality.

The conventional handover is as follows: the serving base station compares the downlink received power that the terminal constantly measures and reports to the serving base station periodically or by an event-driven processing between the local base station and the neighbor base station, and if the downlink received power of the neighbor base station is larger than the downlink received power of the serving base station added with a constant bias value set by the OAM device 9, it makes a determination that the handover be performed to the terminal.

Incidentally, the handover determination by this embodiment is an event-driven type processing that is performed at the time of receiving the above-mentioned multicast information; the conventional handover determination is a periodical one that is performed for every TTI.

When the handover is performed based on the handover determination (S209-1, S209-2), if the determined terminal exists under the base station, the base station will shift to a phase of urging the handover to the terminal and a base station of destination. In FIG. 3, the explanation will be given assuming that the terminal that is connected to the large coverage base station 1 (1-1) and is exerting the interference of high power (S204) to the terminal B (3-1) is subjected to determination of the handover execution (being determined to perform the handover).

The large coverage base station 1 (1-1) that determined execution of the handover unicast transmits a Handover Request (S210) about the terminal to the small coverage base station 2 that is a destination in the handover and to which the terminal to be handed over is exerting the interference of high power. If the small coverage base station 2 that received the request has a resource enough for accepting the terminal, specifically a sufficient radio resource and a hardware resource (a processor and memory), it will reply an acknowledgement that the handover of the terminal is accepted in a unicast manner to the large coverage base station 1(1-1) (S211). If the acceptance is impossible, replying NAK (Non-Acknowledgement) will cause no hindrance to the operation. However, it is rational that the operation is performed on a policy that when resources to receive the terminal run short before the small coverage base station 2 multicasts the interference generation rule (S207), the multicast is not performed in order to prevent useless communication at S210 and S211. This is because the small coverage base station 2 knows whether it can accept a new terminal in terms of the radio resource and the hardware resource at a stage of performing the multicast.

When receiving ACK (Acknowledgement) (S211) to the Handover Request (S210) from the small coverage base station 2, the large coverage base station 1-1 transmits a Handover command (S212) to the terminal B.

When having received the command, the terminal B tries to establish a connection to a base station instructed by the command, i.e., here, the small coverage base station 2. Concretely, the terminal B tries to achieve the downlink reception timing synchronization by referring to a downlink synchronization signal (S213) that is transmitted periodically from the small coverage base station 2, and in a state where it is assumed that an uplink transmission timing is in harmony with a downlink reception timing, executes an initial connection processing (S214) to the small coverage base station 2. This initial connection processing corrects the uplink transmission timing so that it may fit to the reception timing of the small coverage base station 2, and an ID of the terminal that will be used locally within the small coverage base station 2 is given from the small coverage base station 2. When the above processing is completed, the terminal B establishes a connection with the small coverage base station 2, and becomes able to perform the data communication. Incidentally, more detailed information on the handover sequence including processings after S210 is disclosed in 3GPP, "Evolved Universal Terrestrial Radio Access (E-UTRA) and Evolved Universal Terrestrial Radio Access Network (E-UTRAN); Overall description; Stage 2 (Release 10)," TS36.300, pp. 60-91, v 10.3.0, 2011/3, details of the Handover Request is disclosed in 3 GPP, "Evolved Universal Terrestrial Radio Access Network (E-UTRAN); S1 Application Protocol (S1AP) (Release 9)," TS36.413, pp. 75-82, v 9.1.0, 2009/12 and 3GPP, "Evolved Universal Terrestrial Radio Access Network (E-UTRAN); X2 Application Protocol (X2AP) (Release 9)," TS36.423, pp. 12-17 and 27-32, v 9.1.0, 2009/12, and details of the Handover command is disclosed in 3GPP, "Evolved Universal Terrestrial Radio Access (E-UTRA); Radio resource Control (RRC); Protocol Specification (Release 10)," TS36.331, pp. 47-49, pp. 119-120, pp. 191-192, v 10.0.0, 2010/12 as an RRC Reconfiguration message, and details about the initial connection processing is disclosed in 3GPP, "Evolved Universal Terrestrial Radio Access (E-UTRA); Medium Access Control(MAC) protocol specification (Release 10)," TS36.321, pp. 12-17, v 10.0.0, 2010/12, as Random Access Procedure, respectively.

Figure 4:
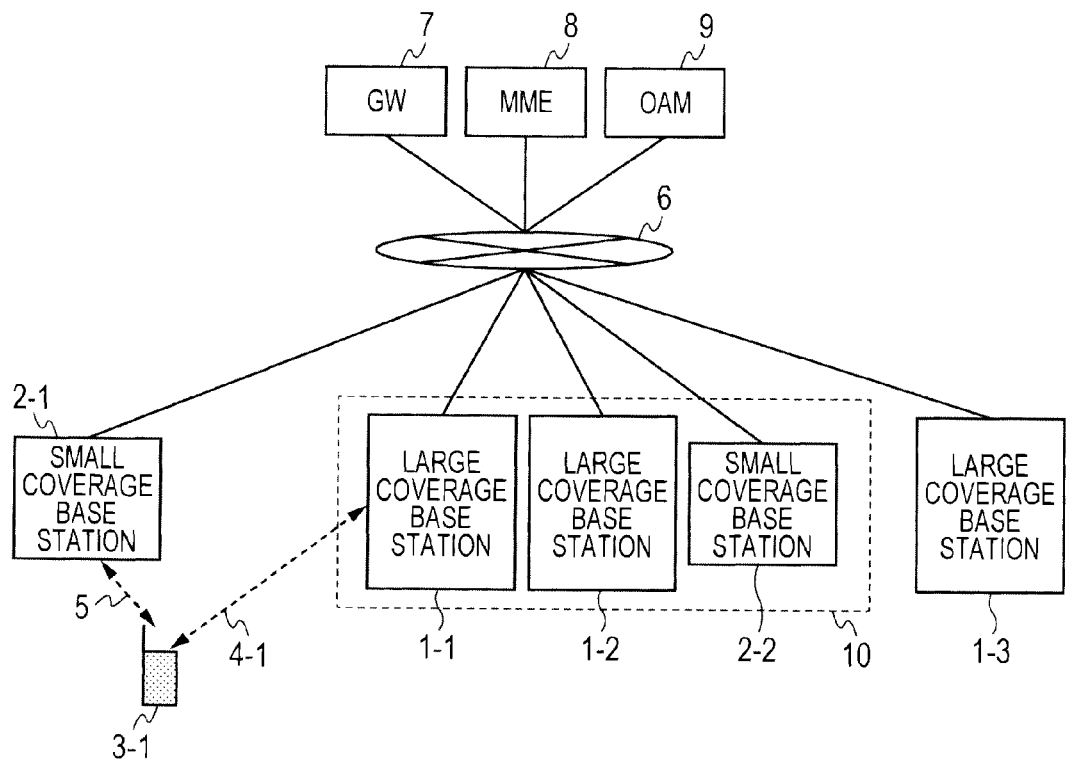
FIG. 4A is a diagram showing a multicast range of interference generation rule information according to this embodiment.
FIG. 4B is an embodiment of a neighbor list according to this embodiment.

FIG. 4A is a diagram showing a multicast range of interference generation rule information from the small coverage base station 2-1. In this figure, there are, for example, three large coverage base stations (1-1, 1-2, 1-3) and two small coverage base stations (2-1, 2-2), and the terminal 3-1 transmits the data signal 4-1 to the large coverage base station 1-1. It is assumed that this data signal 4-1 becomes the serious interference signal 5 to the small coverage base station 2-1, but is an interference signal that can be disregarded from the viewpoint of the received power to other base stations.

Following a sequence diagram of FIG. 3, when the small coverage base station 2-1 receives the interference signal 5 of a large received power from the terminal 3-1 connecting to the large coverage base station 1-1, the small coverage base station 2-1 measures a generation rule of the interference signal and multicast transmits information of the measured interference generation rule to a neighbor base station group 10 that is judged to be the neighbor base stations through the backhaul network 6. Information indicating as to which base station belongs to the neighborhood base station group 10, namely the neighbor list of the small coverage base station 2-1, is distributed from the OAM device 9 to the small coverage base station 2-1 in advance and is stored in a neighbor list buffer that will be described later. Incidentally, the following two cases are all right: a case where the large coverage base station and the small coverage base station exist together in the neighbor list; and a case where only either of the two base stations exists.

FIG. 4B shows a composition example of the neighbor list. As shown in this figure, the neighbor list includes the number of base stations and information for specifying each neighbor base station. The information for specifying each neighbor base station includes a cell ID used in a radio communication section, an IP address necessary to perform mutual communication through the backhaul network 6, and address information that is equivalent to the IP address and uniquely specifies each base station apparatus.

Figure 5:
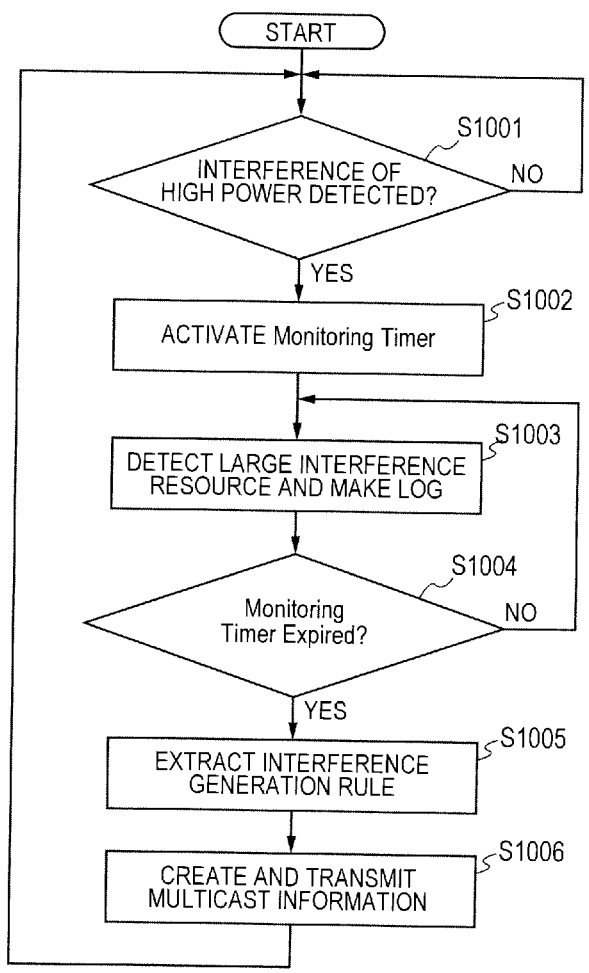
FIG. 5 is an example of a flowchart of a small coverage base station according to this embodiment.

FIG. 5 shows a flowchart of the small coverage base station 2 according to this embodiment. The small coverage base station 2 is also performing usual data communication in parallel to this flowchart. START of this flowchart shows, for example, a time at which the small coverage base station apparatus 2 is activated, and it is assumed that a loop illustrated in the figure is repeated for every TTI.

The small coverage base station 2 determines whether an interference of a large received power is occurring for every TTI (Step S1001). For example, it determines whether an interference power being more than or equal to a previously set threshold, like the above-mentioned S205. When it is judged that a large interference received power is occurring, a Monitoring Timer is activated, the interference of a large received power is monitored until the Timer expires, and a timing and a frequency location at which the large received power occurred are left in a log (Step S1002). The generation rule is measured. The Timer counts up for every TTI. Moreover, the number of TTIs until the Timer expires can be set by the OAM device 9.

After the Timer expires (Step S1004), the small coverage base station 2 extracts the interference generation rule based on a log that was formed in Step S1003 and indicates the timing and the frequency position at which the large interference received power occurred. Concretely, it extracts and stores a TTI period in which the large interference received power occurs, a TTI offset from a reference TTI (for example, 10 TTIs are considered to form a group and its top TTI is designated as the reference TTI), a frequency resource offset indicating a frequency resource position of the large interference received power that occurred (was detected) first, and a frequency resource shift indicating how much a position of the frequency resource is shifted each time the large interference received power occurs.

When Step S1005 is completed, the small coverage base station 2 multicasts the interference generation rule estimated in Step S1005 that is created as a data packet to the neighbor base stations shown in the neighbor list (Step S1006).

Moreover, in addition to the case where the small coverage base station has the neighbor list, the system may be configured so that the system has a device for storing the neighbor list for each base station, a data packet including the interference generation rule that the small coverage base station 2 multicasts is transmitted to the device, and the device transfers the data packet to the neighbor base stations of the small coverage base station 2 based on the neighbor list corresponding to the small coverage base station 2.

In the above process, as long as a principal base station to which the terminal bringing about the large interference received power belongs can be specified, unicast transmission to the principal base station may be done, but it is difficult, as will be shown below.

For example, a first considered approach is to blind decode a data signal subjected to scrambling peculiar to the terminal and perform an inspection using a CRC (Cyclic Redundancy Check) bit added to the data. However, since uplink resource allocation information, such as a terminal ID, a modulation method, a coding rate, an amount of allocated frequency resource, and a frequency position, is unknown, a space of the parameters accompanying blind decoding is too large, and terminal specification is extremely difficult. In order to solve this problem, sending the above-mentioned allocation information from the large coverage base station 1-1 to the small coverage base station 2 in real time is also considerable, but it is not realistic because of squeeze of the communication capability of communication between the base stations through the backhaul network 6.

Moreover, a terminal specifying method using the reference signal peculiar to the terminal is also considerable, but the reference signal received by the small coverage base station 2 side shows a form in which the original reference signal transmitted by the terminal is multiplied by a radio propagation channel response. Usually, the reference signal is used in order to estimate the radio propagation channel response that is an indefinite quantity based on a premise that the reference signal itself is already known on the both sides of transmission and reception. However, in the usage being discussed here, the reference signal itself needs to be estimated. If the radio propagation channel response is known, the reference signal can be estimated, but since the radio propagation channel response is an unfixed quantity, it is difficult to specify the terminal by an approach using the reference signal. Therefore, based on an idea that it is difficult for small coverage base station to specify the mobile terminal of interference source belonging to the large coverage base station 1-1, this embodiment takes an approach in which only time and frequency positions at which the large interference received power occurs are specified and are multicast transmitted to the neighbor base stations.

FIG. 6 is a diagram showing how to detect the large interference received power according to this embodiment.

A horizontal axis is for a number of a frequency resource for uplink of the small coverage base station 2. For example, following standard specifications of LTE (Long Term Evolution), each of the frequency resources 303-1 to 6 is called a Resource block (RB) and has a 180 kHz width that is equal to a bundle of twelve 15-kHz subcarriers. A vertical axis is for uplink received power density (303-1 to 301-6) for every frequency resource. In the uplink received power, there exist together an uplink signal from the terminal that belongs to the small coverage base station 2 and to which the small coverage base station 2 permitted communication in the frequency resource, namely, issued the uplink Grant, and the uplink signal from the terminal that belongs to the neighbor base station and received the uplink Grant issued by the neighbor base station.

If the uplink signal from the terminal belonging to the neighbor base station has the received power that can be disregarded to the uplink signal from the terminal belonging to the base station, the terminal connecting to the base station will control the transmission power in harmony with a target received power (301) of the base station; therefore, the received power densities (303-1 to 303-3, 303-5, and 303-6) of frequency resources will distribute near the target received power, as illustrated. Since it is not necessarily true that a propagation path at the time of deciding the uplink transmission power and a propagation path at the time of actually performing the transmission with the transmission power completely coincide with each other, the received power densities distribute above and below the target received power depending on the frequency resource.

However, when an interference signal of a large received power coming from the terminal belonging to the neighbor base station has arrived, the received power density that far exceeds the target received power 301 is detected in the frequency resource allocated to the terminal. In order to determine whether the interference signal of a large received power occurred when the received power exceeds the target received power 301 by a certain amount, the received power density threshold (302) is provided. It is judged that the interference signal of a large received power occurred in the frequency resource in which the received power density exceeding the threshold is detected, and the interference signal generation time and frequency are left in a log as described in Step S1003 of FIG. 5. A received power density threshold 302 shall be, for example, a value that is the target received power 301 on which a bias value (304) for interference detection is added.

The target received power 301 and the bias value 304 for interference detection can be set by the OAM device 9 for the small coverage base station 2. Incidentally, regarding the target received power 301, one that is obtained by averaging the received power density for each frequency measured by the small coverage base station 2 using a value being set by the OAM device 9 as an initial value may be used.

Incidentally, in the embodiment of FIG. 6, a concept of a zero section in which communication is not performed between the local base station and the terminal, like one that is disclosed in Japanese Unexamined Patent Application Publication No. 2009-303223, is not introduced. Although introducing the zero section creates anticipation of improvement in interference detection accuracy, a communication resource quantity that is allocated to the terminal connecting to the small coverage base station and a throughput decrease; therefore, in this embodiment, a determination using a threshold that is a biased target received power is used. This method gives an effect of being able to utilize the frequency resource at which no interference of a large received power is received.

Figure 7A:
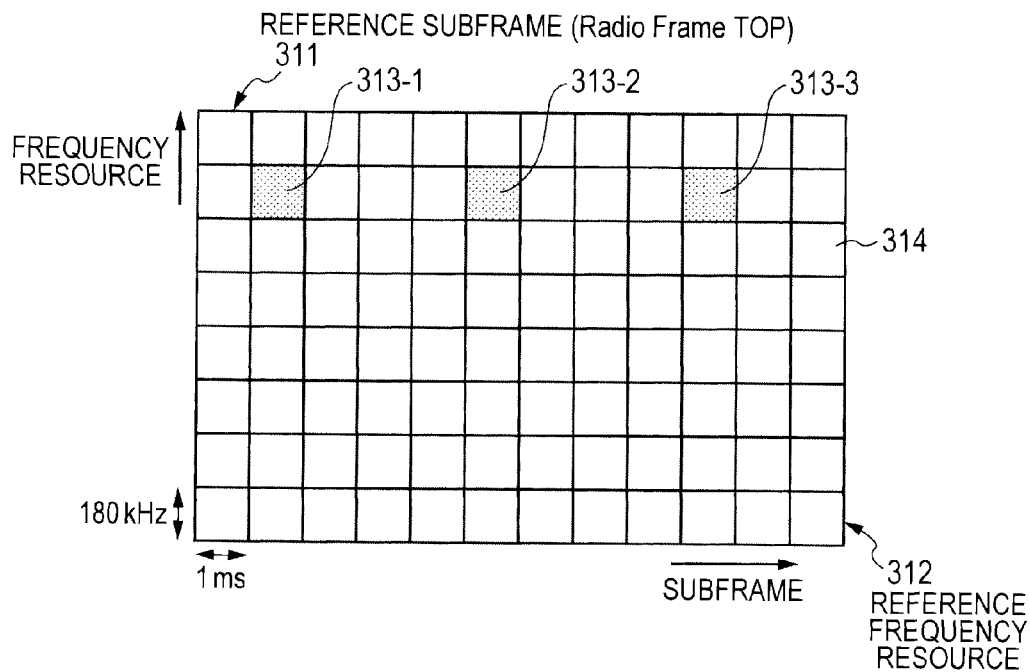
FIG. 7A is a first example of a method for recording large interference received power generation time and frequency in the small coverage base station according to this embodiment.
Figure 7B:
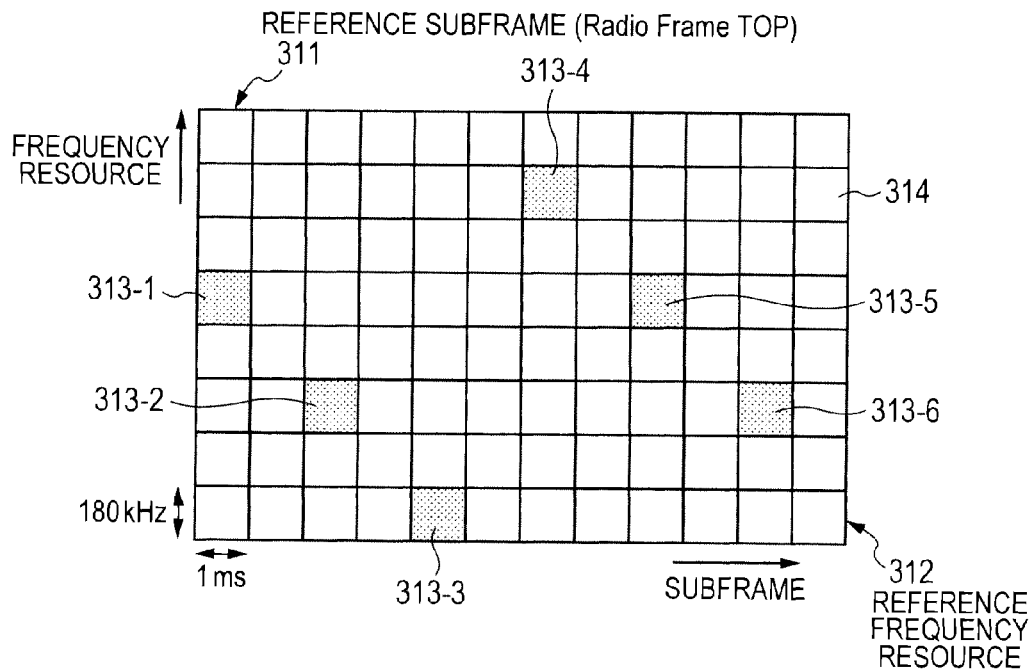
FIG. 7B is a second example of the method for recording the large interference received power generation time and frequency in the small coverage base station according to this embodiment.

FIG. 7A and FIG. 7B are diagrams explaining how to leave in a log the time and frequency positions at which the large interference received power shown in Step S1003 of FIG. 5 is detected.

These two diagrams are the same diagram only except a rule by which the large interference received power occurs. These grid squares show minimum units of a communication resource that the base station apparatus allocates to the terminal. The time direction (a horizontal direction in the figure) is shown in a unit of TTI, and is written as a subframe of 1 ms in this figure. The frequency direction (a vertical direction in the figure) has divided into grids for every minimum unit of the frequency resource allocated to the terminal. Here, according to the Resource block size of the above-mentioned LTE, it is set to 180 kHz. Moreover, regarding the measurement and recording periods, although the number of subframes is set to 12 and the number of frequency resources is set to 8 in this figure, they are not limited to these numbers. Moreover, a leftmost side square shall be a reference subframe 311: for example, one radio frame includes 10 subframes in the LTE, and a subframe at the top of the radio frame shall be a reference subframe. Similarly, a bottommost side square shall be a reference frequency resource 312: for example, the Resource block located at the lowest frequency among all the frequency resources shall be the reference frequency resource.

Open squares 314 show a subframe and the Resource block at each of which the large interference received power was not detected, and filled squares 313 show a subframe and the Resource block at each of which the large interference received power was detected.

FIG. 7A is an example where the large interference received power occurs at every four subframes with the second frame counted from the reference subframe being set as a top, and occurs at each seventh subframe counted from the reference frequency resource in the frequency direction, and a frequency resource shift each time the large interference received power occurs does not occur. FIG. 7A is an example where the large interference received power occurs at each two subframes with the first frame counted from the reference subframe being set as a top and at the fifth subframe counted from the reference frequency resource in the frequency direction, and regarding a frequency resource shift occurring each time the large interference occurs, the shift as much as six frequency resources occurs assuming that the shift is counted to the top side and it is folded back at the top edge. The interference generation rule thus estimated is transmitted to the neighbor base stations described in the neighbor list as a multicast message. The embodiment regarding the multicast message will be described in FIG. 8A and FIG. 8B.

FIG. 8A is an embodiment in the case where the interference generation rule shown in FIG. 7B is comprised as the multicast message. A configuration of the multicast message includes a cell ID 401 of the small coverage base station 2 that acts as a transmission source, a number of the subframe 402 at which the small coverage base station starts a measurement of the interference generation rule, a duration 403 during which the measurement is continued similarly, a subframe duration 404 in which the large interference received power is detected, an offset 405 from the reference subframe, an index (offset) 406 of the Resource block in which the large interference received power was detected first in the measurement duration indicated by 402 and 403, a shift quantity 407 of the Resource block that arises each time the large interference received power is detected, and an indicator 408 indicating as to what kind of physical channel and signal are used to detect the large interference received power.

The cell ID 401 is a value being set by the OAM device 9 when the small coverage base station 2 makes system entry. The subframe number 402 is a sequence number after the small coverage base station is activated, and is a number having a range of, for example, 32 bits and is returned to zero when it exceeds a range of 32 bits. Incidentally, for example, in the LTE, since 10 subframes form one radio frame, the reference subframe corresponds to a subframe number such that a residual when the subframe number is divided by 10 becomes zero. The measurement duration 403 of the interference generation rule is a value set by the OAM device 9. A measured value (an estimated value) at the small coverage base station is set in the interference generation rule shown in 404 to 407. A Measurement Object 408 is an indicator showing a physical channel used for the interference generation rule or a signal, and is set up by the OAM device 9.

FIG. 8B shows an expression that is more generalized FIG. 8A. The figure shows a range of values that 401 to 408 can take. Since the base station that receives this multicast message is relieved of a requirement to perform the blind processing by grasping each field length as the protocol being promised between the base stations, the multicast reception processing can be increased in efficiency.

Figure 9:
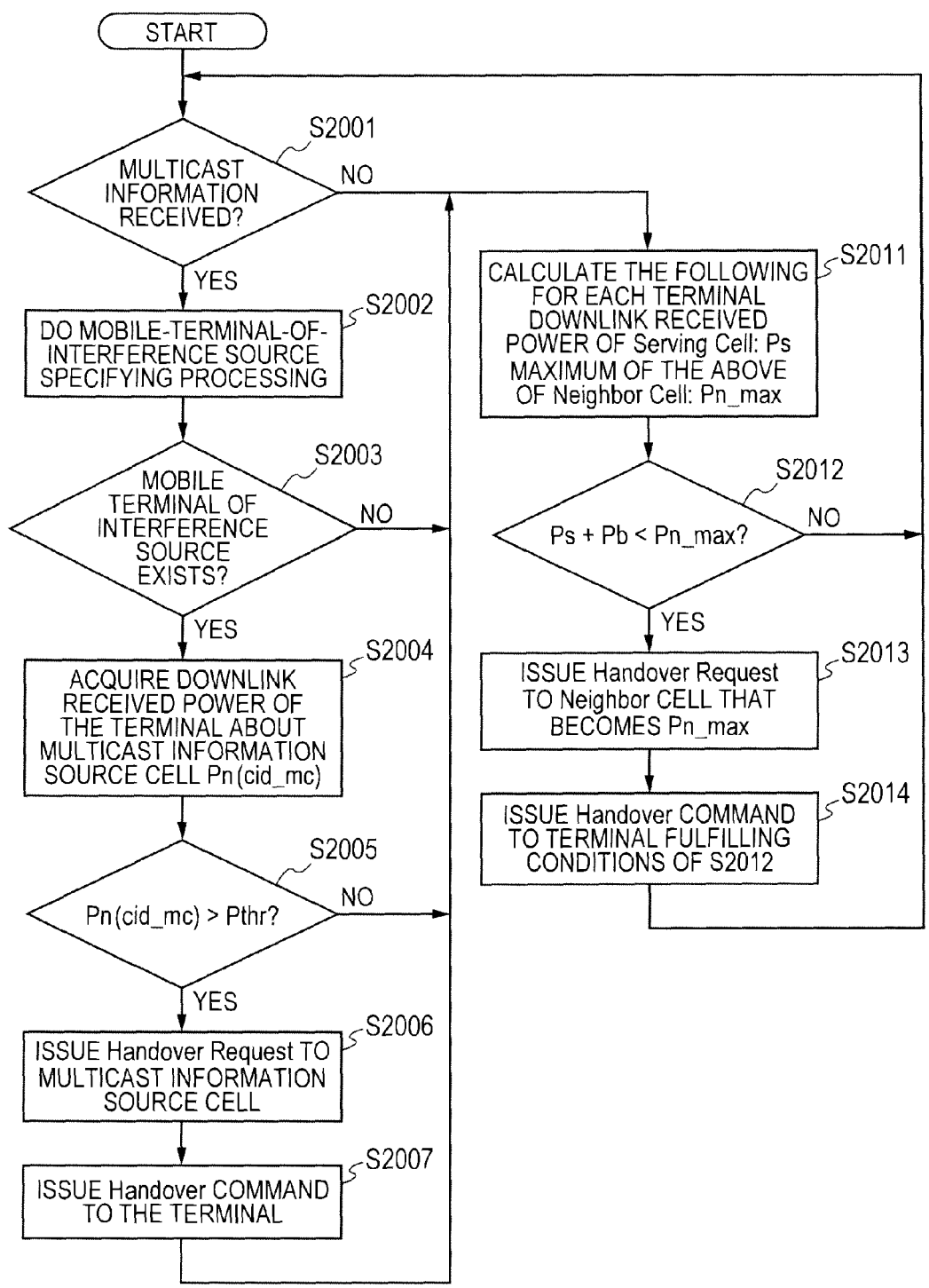
FIG. 9 is an example of a flowchart of a large coverage base station according to this embodiment.

FIG. 9 is a flowchart showing an operation of the large coverage base station 1 according to this embodiment. This flowchart is roughly divided into a left-hand side showing the handover determination by this embodiment and a right-hand side showing the conventional handover determination. Like the flowchart of the small coverage base station 2 shown in FIG. 5, it is assumed that START shows a time when the large coverage base station 1 is activated, and the operation is repeated for every TTI.

In Step S2001, the large coverage base station 1 determines whether the multicast information showing the interference generation rule information shown in FIG. 8A and FIG. 8B is received from the neighbor base station for every TTI. When the multicast information is not received, the conventional handover determination processing in the right-hand side in the figure is started. On the other hand, when the multicast information is received, the process proceeds to the next Step S2002.

In Step S2002, the large coverage base station 1 collates the interference generation rule that was received as the multicast information and a record (log information) in which the base station itself having received the multicast information allocated the uplink communication resource to a belonging terminal, and searches whether a terminal bringing about a large interference signal to the base station being a source of the multicast information exists among the belonging terminals of the local base station Conditional branching is conducted in Step S2003 by whether the relevant terminal exists. If the relevant terminal does not exist, a conventional handover processing in the right-hand side in the figure will be started; on the other hand, if the relevant terminal exists, the process will proceed to Step S2004.

In Step S2004, the large coverage base station 1 acquires the downlink received power of the terminal specified in Step S2002 about the base station being a multicast information source. When the terminal connects to the base station, the terminal is configured to measure the downlink received powers about the principal base station and the neighbor base stations, and to report it to the principal base station periodically or by an event driven processing using a change in the interrelationship between the base stations of the downlink power as a trigger. In a stage where Step S2004 starts, if the downlink received powers have been collected successfully from the terminal regarding the principal base station and the neighbor base stations each being a multicast source, what is necessary will be just to refer to values having been collected. However, from viewpoints of saving an uplink data volume for reporting and reducing power consumption of the terminal required to measure the downlink power, there is a case where the measurement and reporting of the downlink received powers about the neighbor base stations may be stopped unless the downlink power about the principal base station is lower than the threshold. In this case, it is necessary to establish a configuration again to the terminal so that it may measure the downlink power about the base station being a transmission source of the multicast information and report it. The cell ID that the terminal should measure is included in the multicast information.

In Step S2005, the large coverage base station 1 determines whether the downlink received power about the multicast source base station of the terminal acquired in Step S2004 exceeds the previously set threshold. The threshold is a value indicating a turning point as to whether the downlink communication is possible or impossible and is set by the OAM device 9. If the above-mentioned downlink received power is lower than the threshold, the large coverage base station 1 will judge that there is a possibility that the downlink communication becomes interrupted even when the terminal is shifted (handed over) to the base station of the multicast source, and will start the conventional handover processing in the right-hand side in the figure, not performing the handover processing according to this embodiment. If the above-mentioned downlink received power exceeds the threshold, the process will proceed to Step S2006.

Step 2006 is a processing in which the large coverage base station 1 issues the Handover Request about the terminal to the multicast source base station, and waits for an acknowledgement from the multicast source base station. If there are sufficient radio and hardware resources in the multicast source base station that serves as a receiving side of the terminal, ACK will be sent back to the large coverage base station 1; if it is insufficient, NAK will be sent back. In the case of NAK, a handover processing about the terminal is not performed, and the process proceeds to the conventional handover processing in the right-hand side in the figure. In the case of ACK, the Handover command is issued to the terminal in Step 2007, and the actual handover processing is started.

As was described in the explanation of FIG. 3, details about the conventional handover processing are disclosed in (1) 3GPP, "Evolved Universal Terrestrial Radio Access (E-UTRA) and Evolved Universal Terrestrial Radio Access Network (E-UTRAN); Overall description; Stage 2 (Release 10)," TS36.300, pp. 60-91, v 10.3.0, 2011/3, (2) 3GPP, "Evolved Universal Terrestrial Radio Access Network (E-UTRAN); S1 Application Protocol (S1AP) (Release 9)," TS36.413, pp. 75-82, v 9.1.0, 2009/12, (3) 3GPP, "Evolved Universal Terrestrial Radio Access Network (E-UTRAN); X2 Application Protocol (X2AP) (Release 9)," TS36.423, pp. 12-17 and 27-32, v 9.1.0, 2009/12, (4) 3GPP, "Evolved Universal Terrestrial Radio Access (E-UTRA); Radio resource Control (RRC); Protocol Specification (Release 10)," TS36.331, pp. 47-49, pp. 119-120, pp. 191-192, v 10.0.0, 2010/12, and (5) 3GPP, "Evolved Universal Terrestrial Radio Access (E-UTRA); Medium Access Control (MAC) protocol specification (Release 10)," TS36.321, pp. 12-17, v 10.0.0, 2010/12.

Next, the conventional handover processing shown in the right-hand side in the figure will be explained. Incidentally, an appropriate handover processing other than that shown below may be used.

In Step S2011, the large coverage base station 1 acquires the downlink received power about the principal base station and a maximum among the downlink received powers of the neighbor base stations regarding each terminal. However, as was already described, although there is a case where the information of the neighbor base stations cannot be acquired due to an interrelation between the base stations of the downlink received power, such a terminal is excluded from handover candidate terminals.

In Step S2012, the downlink received power about the principal base station and the downlink received power of the terminal that can obtain the maximum among the downlink received powers of the neighbor base stations are compared. In principle, if the downlink received power of the neighbor base station exceeds that of the principal base station, the terminal will become a handover object, but in order to prevent frequent occurrence of the handover caused by variation of the propagation path, usually a control with a hysteresis is performed. That is, the downlink received power of the principal base station is biased, and when the downlink received power of the neighbor base station exceeds the biased downlink received power about the desired signal, the terminal is assigned as a handover candidate and the neighbor base station is designated as the base station of destination. If the terminal that becomes the handover candidate by this processing exists, the process will proceed to Step S2013; if it does not exist, the handover processing in the TTI will be ended.

Steps S2013 and S2014 are the same processing as Steps S2006 and S2007 except that Steps S2013 and S2014 are different from Steps S2006 and S2007 only in the terminal to be handed over and the base station of destination. The first example regarding a processing of specifying the terminal that brings about the interference of high power level to a multicast source base station in the large coverage base station 1 having received the multicast information will be explained using FIG. 10A and FIG. 10B.

FIG. 10A shows a part of the multicast information that the large coverage base station 1 received. It describes again the part of information described in FIG. 8A.

FIG. 10B shows pieces of resource allocation information that are frequency resources allocated to the respective terminals by the large coverage base station 1 having received the multicast information are arranged in time series with the subframe number included in the multicast information placed at the top. In data communication allocation to the terminal by the base station, dynamic scheduling in which a user device identifier is changed dynamically TTI by TTI. If an allocation TTI interval to the terminal and an allocation rule of the frequency resource are known, a simpler approach as shown in FIG. 11B can be taken. In FIG. 10B, since the resource allocation to the terminal is based on the dynamic scheduling, for example, by the base station itself leaving a log as shown in FIG. 10B, a processing of specifying the terminal that is expected in this embodiment can be performed.

In FIG. 10, indexes of the frequency resources are arranged in the vertical direction, and rows of respective TTIs are formed sequentially in the horizontal direction from the top of the interference generation rule measurement duration that the multicast information instructs. The information described in each grid square shows an user device identifier (uid) in the frequency resource and the TTI. If the frequency resource and the TTI with gray hatch 509 that the interference generation rule shown in FIG. 10A shows are overlapped on this table, the terminal that exerts the interference of high power to the base station of a multicast information source can be specified. In the example of this figure, the terminal of uid=3 is specified as a relevant terminal. When multiple terminals exist in the range of gray hatch, they may be processed, for example, as if the terminal could not be specified.

A second example regarding the processing of specifying the terminal that brings about the interference of high power level to the multicast source base station in the large coverage base station 1 having received the multicast information will be explained using FIG. 11A and FIG. 11B.

FIG. 11A shows the multicast information that the large coverage base station 1 received. Although it is almost the same as that of FIG. 10A, a Measurement Object 506 is changed to a Reference from Data. A difference between the Data and the Reference is intended to be a difference caused by that the communication resource that is allocated to the terminal by the base station is through the dynamic scheduling or through fixed scheduling. As a representative of such a Reference, there is a Sounding Reference Signal (SRS) specified by LTE standard specifications. The SRS enables the base station to configure the transmission subframe and the subframe offset for every terminal. The terminal can be configured to be able to transmit by wideband transmission that uses the whole frequency resources or by using a part of the frequency resource at each transmission timing, and so that the transmission frequency resource may do hopping at each transmission timing. Thus, the Reference represents a signal whose transmission method is configured in advance to the terminal by the base station and that is transmitted from the terminal according to a fixed time and frequency rule.

FIG. 11B is a table showing how the large coverage base station 1 has configured the transmission method of the Reference to each of its belonging terminals. This configuration information can be stored in advance in the large coverage base station 1. The large coverage base station 1 collates the multicast information shown in FIG. 11A and the configuration information of FIG. 118 to search the terminal in which the configuration information coincides with the multicast information.

Information items that agree with the configuration information of FIG. 11B in the multicast information shown in FIG. 11A are four kinds of items 502, 503, 504, and 505, and these correspond to 511, 512, 513, and 514 of FIG. 11B, respectively. In the example of this figure, since the multicast information and the configuration information shown in FIG. 11A are in coincidence in the terminal of User Equipment ID=3, the terminal of the ID=3 is judged to bring about the large interference received power to the small coverage base station 2. When full coincidence between the multicast information and the configuration information as shown in FIG. 11B cannot be checked, it may be judged that the terminal being bringing about the interference of high power level to the multicast source base station cannot be specified.

Figures 12A, 12B:
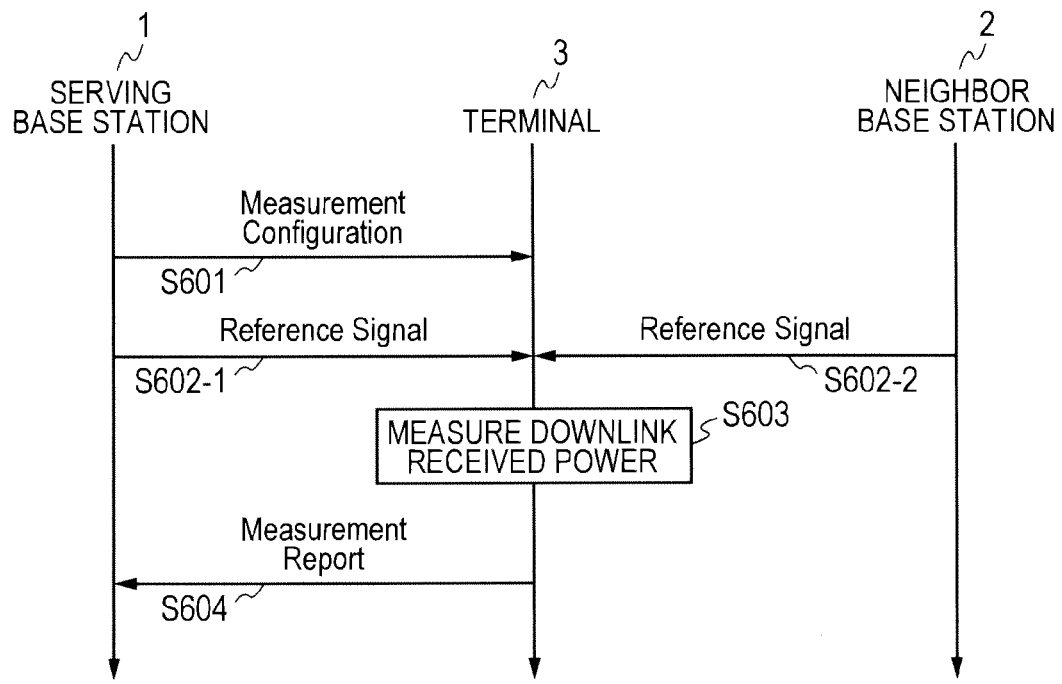
FIG. 12A is an example of an operating sequence of a downlink received power acquisition processing according to this embodiment.
FIG. 12B is one example of a downlink received power acquisition result about each terminal in the large coverage base station according to this embodiment.

A method as to how the base station acquires the downlink received power in the terminal shown in Step S2004 of FIG. 9 will be shown using FIG. 12A and FIG. 12B. FIG. 12A summarizes the operating sequences, and FIG. 12B summarizes the downlink received powers for every terminal and for every base station that the base station acquires in a table.

First, according to FIG. 12A, a procedure ranging from measurement of the downlink received power by the terminal to reporting of it to the base station will be explained. First, the base station 1 to which the terminal is connected performs a Measurement Configuration (S601) to the terminal 3. This configuration includes, for example, the cell ID of the base station (the serving base station of the terminal and its neighbor base stations) that becomes a measurement object, a frequency band in which measurement is done, a temporal duration in which the communication resource for the data communication is not allocated (being termed a Measurement Gap in the LTE standard specification), and a time period at which the downlink received power measurement result is reported to the base station or a trigger condition by which the measurement result is reported to the base station (for example, a condition of a downlink received power difference between the serving base station and the neighbor base station, etc.). Incidentally, the cell ID of the base station that becomes a measurement object is based on the neighbor list held by the base station transmitting the configuration. The terminal 3 measures the downlink received powers about respective base stations using the downlink reference signals (S602-1, S602-2) transmitted from the serving base station 1 and the neighbor base station 2, respectively, according to the configuration received in S601 (S603). After the measurement, when the time duration or trigger condition that was configured in S601 is fulfilled, the terminal 3 reports the measurement result to the serving base station 1 (S604).

FIG. 12B is a table of the downlink received powers for each terminal and for each base station created based on a Measurement Report (S604) that is reported from each terminal 3 connecting to the serving base station 1 to the serving base station 1. The base station name is based on the neighbor list shown in FIG. 4B. The terminals are arranged in the horizontal direction. Although the terminal should measure in principle the downlink received powers about all the base stations that were configured by the serving base station, there is a case where a part of the measuring operation and a reporting operation by the terminal may be omitted from the a viewpoint of a battery life of the terminal and saving of the uplink communication band. Such an operation is performed by the base station performing not a periodical report but an event-driven type configuration of a report.

At this time, a part of table shown in FIG. 12B may not be filled. However, in the case where regarding the terminal that was specified to exert the large uplink interference to a certain neighbor base station in Step S2003 of FIG. 9, the terminal has not reported the downlink received power about the neighbor base station, processings of the Measurement Configuration in Step S501 and thereafter are performed following the operating sequence shown in FIG. 12A so that the terminal should report the downlink received power about the neighbor base station, whereby the downlink received power can be acquired in Step S2004.

FIG. 13 explains a difference between the handover determination according to this embodiment and the conventional handover determination will be explained on a premise that the downlink received power for every base station and for every terminal shown in FIG. 12B have been collected successfully by an operating sequence of FIG. 12A.

FIG. 13 is a bar graph with the base station shown in the horizontal direction and the downlink received power about each base station shown in the vertical direction. This graph is the downlink received power reported from a certain terminal connecting to the large coverage base station 1-1. It is in a state where the downlink received powers about not only the large coverage base station 1-1 being the serving base station but also the large coverage base station 1-2 being the serving base station and the small coverage base station 2-2 are reported −90 [dBm], −140 [dBm], and −95 [dBm], respectively.

In the usual handover processing, when the downlink received power of the neighbor base station exceeds the threshold (621) that is the downlink received power of the large coverage base station 1-1 being the serving base station biased with Pb [dB], the handover processing that designates the neighbor base station whose downlink received power exceeds the threshold 621 as a destination, for example, processings corresponding to Step S210 and thereafter shown in FIG. 3 are started. Incidentally, the bias value Pb is set by the OAM device 9.

On the other hand, the handover processing by this embodiment will begin by the neighbor base station multicast transmitting the interference generation rule information. The cell ID of the base station being the multicast information source is stored in the same multicast information. Since a determination of handover execution according to this embodiment, being different from the conventional one, aims at avoiding a serious uplink interference even if the terminal dares to be moved from the base station whose downlink quality is excellent to the base station whose downlink quality is bad, if the downlink received power is secured to such a degree that it establishes the downlink data communication at the least, it will be enough regarding the downlink communication quality. For example, it is possible to set the downlink received power to a value that holds the downlink communication and is as low as possible. For example, it is also possible to set a threshold Pthr to a value smaller than the downlink received power of the large coverage base station 1-1. In FIG. 13, the threshold Pthr is provided at −100 dBm.

The threshold Pthr is set by the OAM device 9. Assume a case where the source base station of the multicast information is the large coverage base station 1-2. Since the downlink received power is −140 [dBm] and is lower than the threshold Pthr=−100 dBm, it is anticipated that when the terminal is handed over to the large coverage base station 1-2, the downlink communication comes to be not established although the uplink interference received power at the large coverage base station 1-2 being the neighbor base station is large; therefore, the handover is not performed.

On the other hand, in the case where the source base station of the multicast information is the small coverage base station 2-2, since the downlink received power is −95 [dBm] and exceeds the threshold Pthr=−100 dBm, the downlink received power does not reach to that of the current serving base station, i.e., the large coverage base station 1-1, but the serious uplink interference to the neighbor base station, i.e., the small coverage base station 2-2 can be suppressed; therefore, the handover processing to the terminal is started.

Incidentally, if the handover is performed on this condition, the downlink received power of the terminal after the handover will become −95 dBm in the case of the small coverage base station 2-2 being a new serving base station, and −90 dBm in the case of the large coverage base station 2-2 becoming the neighbor base station, which shows that the neighbor base station has a larger received power. There are two problems that may occur at this time. The first one is that the downlink communication quality deteriorates and the second one is a point that the terminal returns to the original large coverage base station 1-1 by the handover immediately.

The first problem will pose little problem practically if a radio resource activity ratio of each base station is low. That the radio resource activity ratio is low means that an interference signal using the same radio resource as the radio resource by which the desired signal is transmitted becomes difficult to occur stochastically. Conversely, the downlink communication quality deteriorate substantially due to the interference signal stochastically, but if it is averaged on a long-term basis, there will be room to improve the downlink communication quality. However, this improvement depends on the radio resource activity ratio, in the case where the radio resource activity ratio is high and a probability of generation of the interference signal is high, this first problem is avoidable by utilizing technologies of eICIC (enhanced Inter Cell Interference Control) and CoMP (Coordinated Multi-Point Transmission/Reception) that are being examined for standardization in the LTE-Advanced standardization. Incidentally, eICIC is disclosed in 3GPP, "Evolved Universal Terrestrial Radio Access (E-UTRA) and Evolved Universal Terrestrial Radio Access Network (E-UTRAN); Overall description; Stage 2 (Release 10)," TS36.300, pp. 119-120, v 10.3.0, 2011/3, and CoMP is disclosed in 3GPP, "Evolved Universal Terrestrial Radio Access (E-UTRA); Further advancements for E-UTRA physical layer aspects (Release 9)," TR36.814, pp. 15-19, v 9.0.0, 2010/3.

The second problem is that, even if the terminal was handed over to the small coverage base station 2-2 side, due to the conventional handover processing that is performed in the small coverage base station, the terminal will be again handed over to the original large coverage base station 1-1. In order to avoid this problem, it is avoidable by setting a bias value Pr shown in FIG. 13 comparatively large to the small coverage base station 2-2. For example, in an example of FIG. 13, if the bias value Pb is set to Pb=6 dB of the small coverage base station 2-2, unless the downlink received power about the neighbor base station does not exceed −95 [dBm]+6 [dB]=−89 [dBm], the handover does not occur again. If this is set to Pb=4 dB, the downlink received power will become −95 [dBm]+4 [dB]=−91 [dBm], the downlink received power about the large coverage base station 1-1 being the neighbor base station will become −90 [dBm] to exceed the threshold, and therefore, the handover whose destination is the large coverage base station 1-1 will occur again immediately after the handover. Regarding the bias value Pb, for example, the large coverage base station 1-1 being a handover source may decide it based on the downlink received power (for example, −90 dBm) about the local base station, and may notify it to the small coverage base station 2-2 being a handover destination. The small coverage base station 2-2 may reset the bias value Pb according to this notification.

Figure 14:
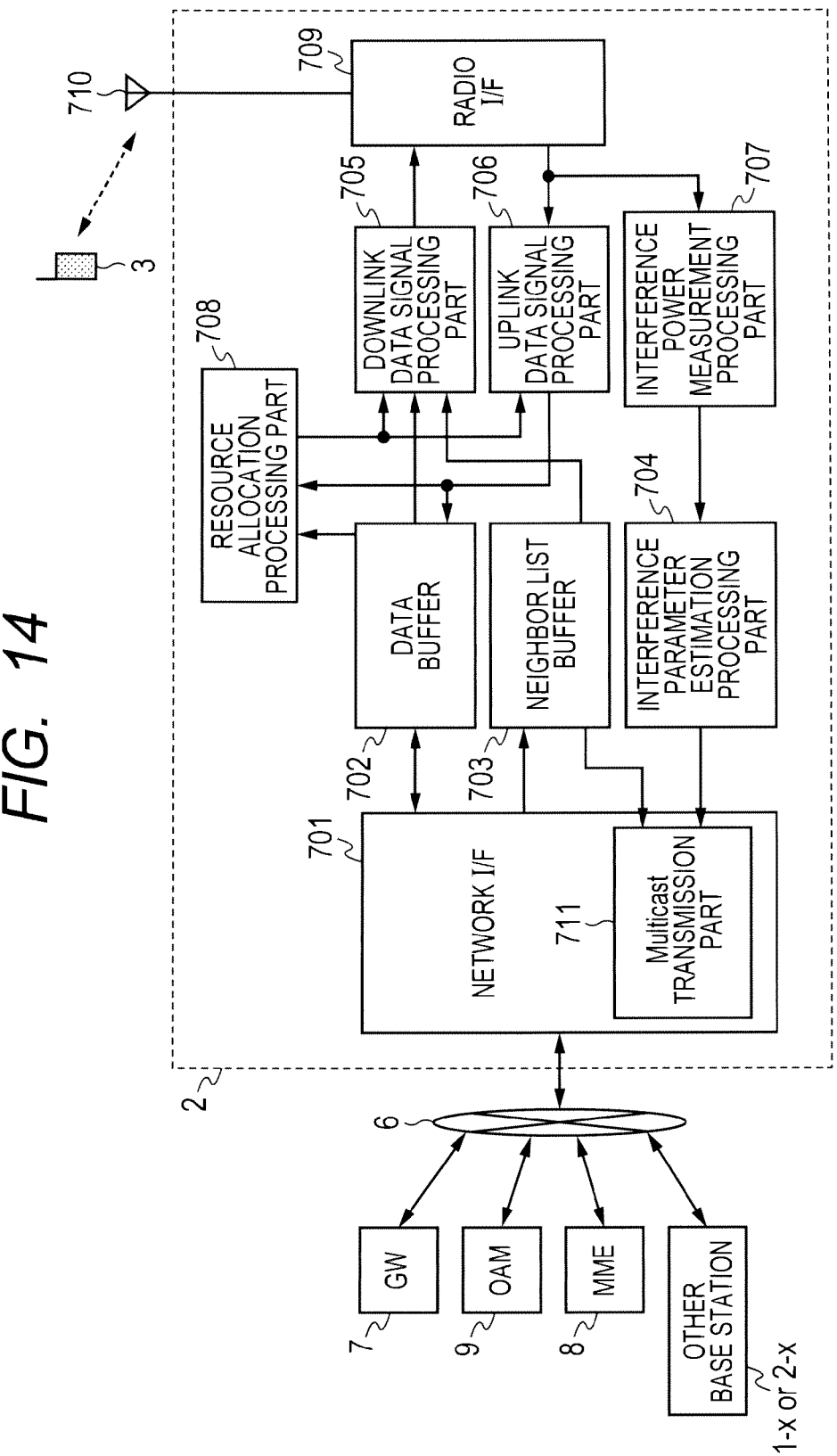
FIG. 14 is a block diagram showing a configuration of the small coverage base station according to this embodiment.

FIG. 14 is a block diagram showing a configuration of the small coverage base station 2 according to this embodiment. The small coverage base station 2 has, for example, a network interface part 701, a data buffer 702, a neighbor list buffer 703, an interference parameter estimation processing part (interference generation rule inferring part) 704, a downlink data signal processing part 705, an uplink data signal processing part 706, an interference power measuring processing part 707, a resource allocation processing part 708, a radio interface part 709, and a base station antenna 710. The network interface part 701 has a multicast transmission part 711.

The terminal 3 performs radio communication with the small coverage base station 2 through the antenna 710. The radio interface part 709 includes analog components: for example, a duplexer for discriminating radio frequencies that are different between uplink and downlink; a power amplifier for amplifying a downlink radio frequency signal; a low noise amplifier for amplifying an uplink radio frequency signal; an up converter for converting a downlink baseband signal into the downlink radio frequency signal; a down converter for converting the uplink radio frequency signal into an uplink baseband signal; a digital-analog converter for converting a downlink baseband digital signal into a downlink baseband analog signal; an analog-digital converter for converting an uplink baseband analog signal into an uplink baseband digital signal, and the like. The above-mentioned low noise amplifier has a function of AGC (Automatic Gain Control) that performs a gain control adaptively on the input, namely weakening a strong received power and strengthening a weak received power, so that an output voltage corresponding to the averaged received power is adjusted to be constant.

The downlink data signal processing part 705 reads the bit sequences of the user data and the control information from the data buffer 702, performs coding, modulation, user data mapping to the radio resource, inverse Fourier transform, etc. according to a standard protocol, such as LTE, and outputs a baseband digital IQ sampling signal to the radio interface part 709. The above-mentioned user data mapping is controlled according to an instruction from the resource allocation processing part 708.

The uplink data signal processing part 706 performs a Fourier transform, detection, user data demapping, demodulation, and decoding on the baseband digital IQ sampling signal inputted from the radio interface part 709 and writes the bit sequences of the user data and the control information in the data buffer 702.

The interference power measuring processing part 707 performs Fourier transform on the baseband digital IQ sampling signal inputted from the radio interface part 709, and measures the received power for each frequency resource over a time of the TTI to the signal converted into the frequency domain. To a received signal of the LTE standard specification, the received power is measured by totaling sums of squares of an I component and a Q component of an IQ received symbol in a range defined by 12 subcarriers in a frequency direction and one subframe in a time direction. However, since an AGC processing is performed in the radio interface part 709 at this time, it is necessary to correct the above-mentioned value of the sums of squares by inputting what amount of gain was multiplied in the AGC into the interference power measuring processing part 707. The measurement result of the interference power is outputted to the interference parameter estimation processing part 704 in the later stage. Incidentally, since parts of the uplink data signal processing part 706 and the interference power measuring processing part 707 up to Fourier transform of the input signal have the same configuration, an output after a Fourier transform processing may be shared between the uplink data signal processing part 706 and the interference power measuring processing part 707.

The resource allocation processing part 708 performs radio resource allocation in the uplink and downlink communications. It is important to leave a log of an allocation result as shown in FIG. 10B and FIG. 11B in this embodiment, and the allocation can be done by any allocation algorithm. When the resource allocation algorithm according to the communication quality of each terminal is applied, with respect to the downlink communication, the terminal measures the downlink communication quality, for example, the communication quality information corresponding to Channel Quality Indicator (CQI) etc. in the LTE standard specifications, and feed it back to the base station apparatus. That is, information of the CQI etc. is processed in the uplink data signal processing part 706, and an outputted bit sequence, i.e., the downlink communication quality information of the CQI etc. is stored in the data buffer 702. The resource allocation processing part 708 refers to this stored result and performs the downlink resource allocation to each terminal.

Similarly, with respect to the uplink communication, the base station apparatus estimates CQI etc. in the uplink data signal processing part 706 using the reference signal that the terminal transmits, for example, SRS, and stores an estimated result in the data buffer 702. Incidentally, an uplink radio resource allocation result is notified to the downlink data signal processing part 705 and the uplink data signal processing part 706, while a downlink radio resource allocation result is notified only to the downlink data signal processing part 705. Meaning of notifying the uplink radio resource allocation result to the downlink data signal processing part 705 is to intend to transmit uplink allocation information as the uplink Grant to the terminal. Similarly, meaning of notifying the uplink radio resource allocation result to the uplink data signal processing part 706 is to intend to perform a processing of demodulation and decoding without relying upon blind decode by having inputted a fact as to which terminal transmits the signal in each frequency resource and as to which modulation method, coding rate, etc. are applied to the signal. The intention of notifying the downlink radio resource allocation result to the downlink data signal processing part 705 includes an intention of instructing as to which data addressed to a certain terminal is transmitted and as to which modulation method, coding rate, etc. are used to transmit the data in each frequency resource, and an intention of creating the allocation information as the control information by a fixed modulation method and with a fixed coding rate. The interference parameter estimation processing part 704 performs threshold determination on the measurement result of an interference power that the interference power measuring processing part 707 outputs for each frequency resource, recording of time and frequency positions at which the large interference received power as shown in FIG. 7A and FIG. 7B is detected, and extraction of the interference generation rule in Step S1001 up to Step S1005 according to the flowchart shown in FIG. 5.

The neighbor list buffer 703 is a buffer for storing the neighbor list of the small coverage base station 2 notified from the OAM device 9. This neighbor list is referred to by the multicast transmission part 711 and the downlink data signal processing part 705 as a content of the Measurement Configuration to the terminal. The data buffer 702 is a buffer for temporarily storing the user data and the control information about each terminal. In the downlink direction, the data buffer 702 temporarily stores the user data inputted from a gateway 7, and the data is read by the downlink data signal processing part 205 that received an instruction of a resource allocation processing part 208. In the uplink direction, the data buffer 702 temporarily stores the user data and the control information outputted from an uplink data signal processing part 206, and the data is referred to by the resource allocation processing part 208, is outputted to the gateway 7, and is done in an other way.

The network interface part 701 is placed between both of the data buffer 702 and the neighbor list buffer 703 and the backhaul network 6, and performs conversion between the packet transmitted in the backhaul network 6 and a payload in the packet used by the small coverage base station 2 side. A portion of the packet with the payload excluded from it is a region where a transmission control (destination address etc.) in the backhaul networks 6, such as a header, is performed.

The multicast transmission part 711 refers to contents of the neighbor list and multicast transmits information of the interference generation rule that the interference parameter estimation processing part 704 outputted, concretely, information as shown in FIG. 8A, to the neighbor base station group described in the neighbor list. The multicast transmission referred to here is required just to perform a transmission that achieves the multicast as its function and, for example, an identical payload may be unicast transmitted to each of the neighbor base stations. The multicast transmission part 711 performs Step S1006 shown in FIG. 5.

Figure 15:
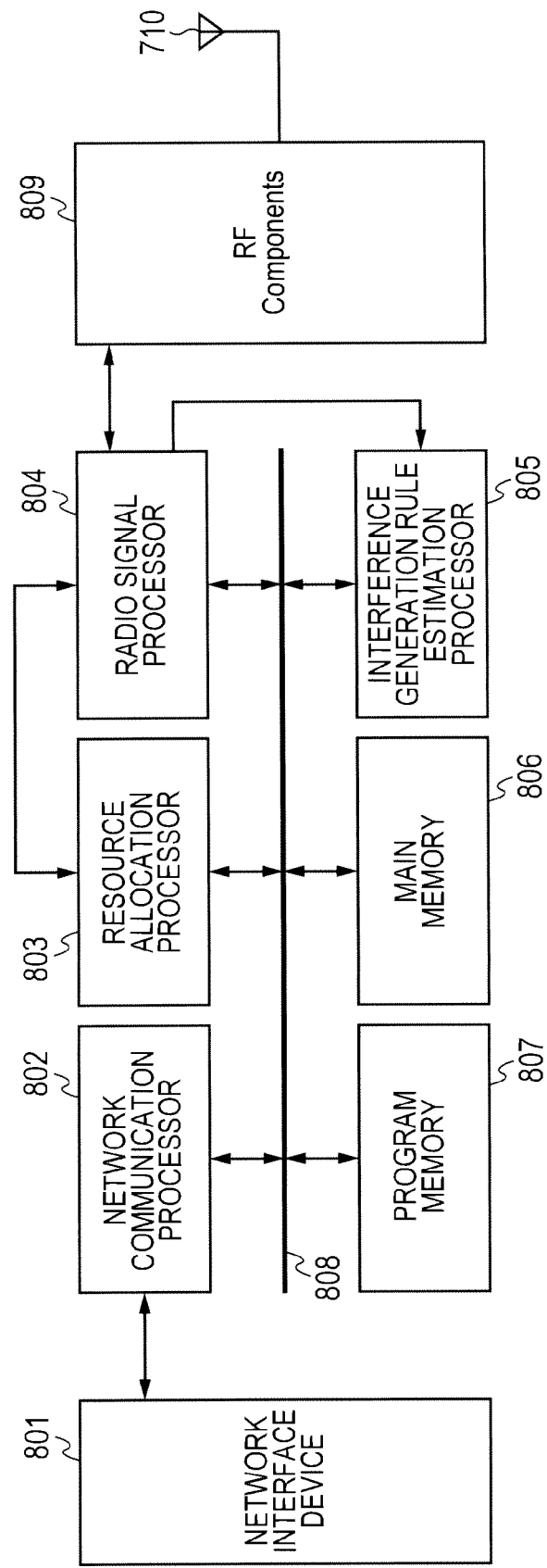
FIG. 15 is a configuration diagram of devices of the small coverage base station according to this embodiment.

FIG. 15 shows a device configuration of the small coverage base station according to this embodiment.

Each block shown in FIG. 14 can be performed by, for example, each device shown in FIG. 15.

A network interface device 801 is a device that has an interface function to the backhaul network 6, and has a socket for connecting a cable on the backhaul network 6 side. Various network interface cards are available in the market.

Symbols 802 to 805 are processors that have respective functions, and a reason why the processors are provided separately is that a multi-process processing and interprocess communication are assumed. As long as a processor supports a multithread or the multi-process processing, these functions may be integrated into a single or multiple processors appropriately. Moreover, programs of these processors are stored in program memory 807, and when the small coverage base station 2 starts or reboots, these are read from the program memory 807 into each of the processors 802 to 805.

The network communication processor 802 has a function of processing communications with the gateway device 7, the MME device 8, the OAM device 9, and other base stations, and also has a function of writing the received data in main memory 806 and a function of reading transmission data from the main memory 806. Moreover, it has a function of multicast transmitting the interference generation rule information that the interference generation rule estimation processor 805 wrote in the main memory 806 via a memory bus 808 to the neighbor base stations following the neighbor list stored in the main memory 806, and also has functions of receiving an update program for each processor from the OAM device 9 and writing it in the program memory 807.

The resource allocation processor 803 is a processor that governs a function of the resource allocation processing part 708 of FIG. 14, and has functions of: acquiring the downlink communication quality reported from each terminal, an uplink communication quality for every terminal that the base station itself estimates, and a residual quantity of data addressed to each terminal from the main memory 806; performing so-called packet scheduling; and notifying choice of the terminal that communicates with each radio resource and the modulation method and an encoding system that are applied in the each radio resource to a radio signal processor 804.

The radio signal processor 804 is a processor that governs functions of the downlink data signal processing part 705 and the uplink data signal processing part 706 of FIG. 14. According to the resource allocation result that was instructed from the resource allocation processor 803 and the coding and modulation methods, the radio signal processor 804 performs processings of reading data of the terminal to which the resource is allocated in the case of the downlink communication, and of writing a demodulation and decoding result in the main memory 806 in the case of the uplink communication. Moreover, it also has a function of writing the downlink communication quality of each terminal included in the uplink signal and the uplink communication quality estimated from the uplink reference signal in the main memory 806.

The interference generation rule estimation processor 805 governs functions of the interference power measuring processing part 707 and the interference parameter estimation processing part 704 of FIG. 14. It inputs therein a signal that is a baseband digital IQ signal in the frequency domain outputted from the radio signal processing processor 804 after being branched, derives a rule of a time and a frequency at which the interference power exceeding the threshold is detected, and writes information of the derived interference generation rule in the main memory 806.

An RF component 809 has a function of converting a baseband digital IQ downlink signal into a radio frequency analog IQ downlink signal and a function of converting a radio frequency analog IQ uplink signal into a baseband digital IQ uplink signal. The RF component 809 has, like the radio interface part 709 of FIG. 14, the duplexer for discriminating radio frequencies that are different between uplink and downlink, the power amplifier for amplifying the downlink radio frequency signal, the low noise amplifier for amplifying the uplink radio frequency signal, the up converter for converting the down baseband signal into the downlink radio frequency signal, the down converter for converting the uplink radio frequency signal into the uplink baseband signal, the digital-analog converter for converting the downlink baseband digital signal into the downlink baseband analog signal, the analog-digital converter for converting the uplink baseband analog signal into the uplink baseband digital signal, and the like. The above-mentioned low noise amplifier has a function of controlling a gain to an input adaptively, in such a way to weaken a strong received power and strengthen a weak received power, so that the output voltage corresponding to an average received power may become constant. Moreover, the duplexer has an antenna cable socket for connecting an antenna on its radio side.

Figure 16:
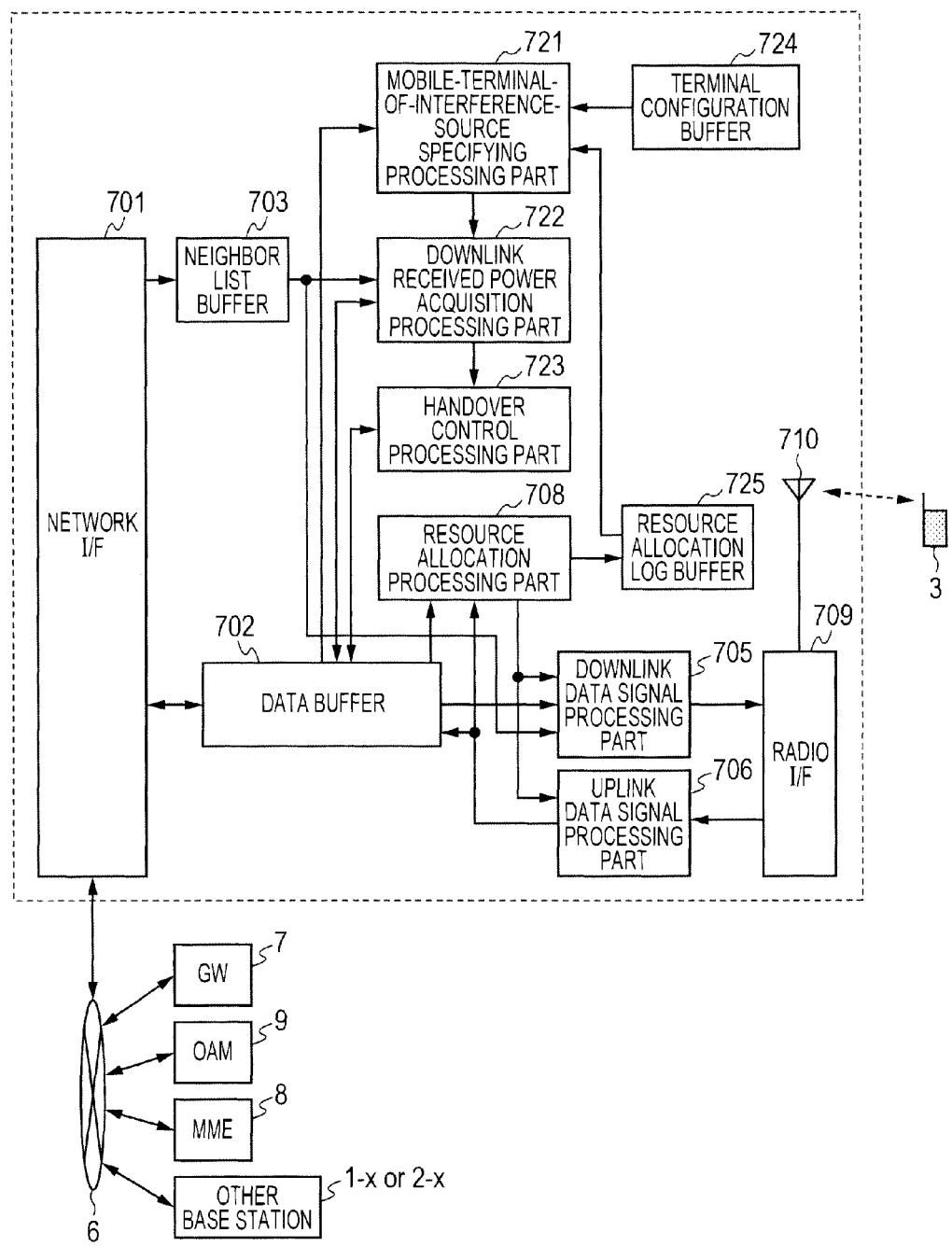
FIG. 16 is a block diagram showing a configuration of the large coverage base station according to this embodiment.

FIG. 16 is a block diagram showing a configuration of the large coverage base station 1 according to this embodiment.

Since the large coverage base station 1 has the same configuration as that of FIG. 14 with respect to the radio side away from the radio interface part 709 and the backhaul side away from the network interface part 701 except nonexistence of the multicast transmission part 711, its explanation is omitted. Moreover, since functions of the downlink data signal processing part 705 and the uplink data signal processing part 706 and their relationships with the resource allocation processing part 208 are the same as those of FIG. 14, their explanations are omitted. Below, the configuration will be explained mainly focusing on a difference from FIG. 14.

The large coverage base station 1 has, for example, the network interface part 701, the data buffer 702, the neighbor list buffer 703, the downlink data signal processing part 705, the uplink data signal processing part 706, the resource allocation processing part 708, the radio interface part 709, and the base station antenna 710, and further has a mobile-terminal-of-interference-source specifying processing part 721, a downlink received power acquisition processing part 722, a handover control processing part 723, a terminal configuration buffer 724, and a resource allocation log buffer 725.

In addition to the functions described in FIG. 14, the following functions are added to the data buffer 702: a function of storing the Measurement Configuration of FIG. 12A created by the downlink received power acquisition processing part 722 and the Measurement Report created by the terminal; a function as a temporary buffer in order that the handover control processing part 723 issues the Handover Request relevant to Steps S2006, S2007, S2013, and S2014 shown in FIG. 9, performs an ACK/NAK reception processing to the Request, and issues the Handover command to the terminal; and a function for temporarily storing the received multicast information in order to output the received multicast information to the mobile-terminal-of-interference-source specifying processing part 721.

In the case where Measurement Object is a data signal that is premised on the dynamic scheduling, the terminal of interference source specifying processing part 721 collates the multicast information that is temporarily stored in the data buffer 702, specifically information stored in a format shown in FIG. 10A and FIG. 11A, and the uplink resource allocation information that the resource allocation processing part 208 stores in a format shown in FIG. 10B in the resource allocation log buffer 725. Moreover, in the case of reference signals, such as SRS, for which the Measurement Object premises a fixed scheduling, the mobile-terminal-of-interference-source specifying processing part 721 performs a processing of collating the multicast information and the configuration information of the terminal configuration buffer 724 in which the configuration of the transmission method of the reference signal of each terminal is stored in a format shown in FIG. 11B. The mobile-terminal-of-interference-source specifying processing part 721 performs Steps S2001 to S2003 in the flowchart shown in FIG. 9. Moreover, the mobile-terminal-of-interference-source specifying processing part notifies the downlink received power acquisition processing part 722 in the latter stage of an ID (uid) of the terminal that was specified to exert the large uplink interference to the source base station of the multicast information.

The downlink received power acquisition processing part 722 holds the downlink received power at each terminal being controlled according to the sequence shown in FIG. 12A in a format of FIG. 12B. Pieces of information of the Measurement Configuration transmitted to the terminal and the Measurement Report transmitted from the terminal are transmitted between the downlink received power acquisition processing part 722 and both of the downlink data signal processing part 705 and the uplink data signal processing part 706 through the data buffer 702. Regarding the ID of the terminal outputted by the mobile-terminal-of-interference-source specifying processing part 721, the downlink received power acquisition processing part 722 acquires the downlink received power of the source base station of the multicast information from the table of FIG. 12B or by following a sequence of FIG. 12A. The downlink received power acquisition processing part 722 executes Step S2004 in steps of FIG. 9. The downlink received power acquired here is outputted to the handover control processing part 723.

The handover control processing part 723 performs processings of Steps S2005, S2006, S2007, S2011, S2012, S2013, and S2014 of FIG. 9, and depending on a control result, transmits the Handover Request to the neighbor base station and the Handover command to the terminal to be moved to the network interface part 701 and the downlink data signal processing part 705 through the data buffer 702.

The terminal configuration buffer 724 is a buffer for storing configuration information, such as a transmission period of the reference signal, such as SRS that is configured to each terminal, etc. in a format, for example, as shown in FIG. 11B, which is referred to by the mobile-terminal-of-interference-source specifying processing part 721.

The terminal configuration buffer 725 is a buffer for temporarily storing the uplink frequency resource that the resource allocation processing part 208 allocated to the terminal as a log in a format, for example, as shown in FIG. 10B, which is referred to by the mobile-terminal-of-interference-source specifying processing part 721.

Figure 17:
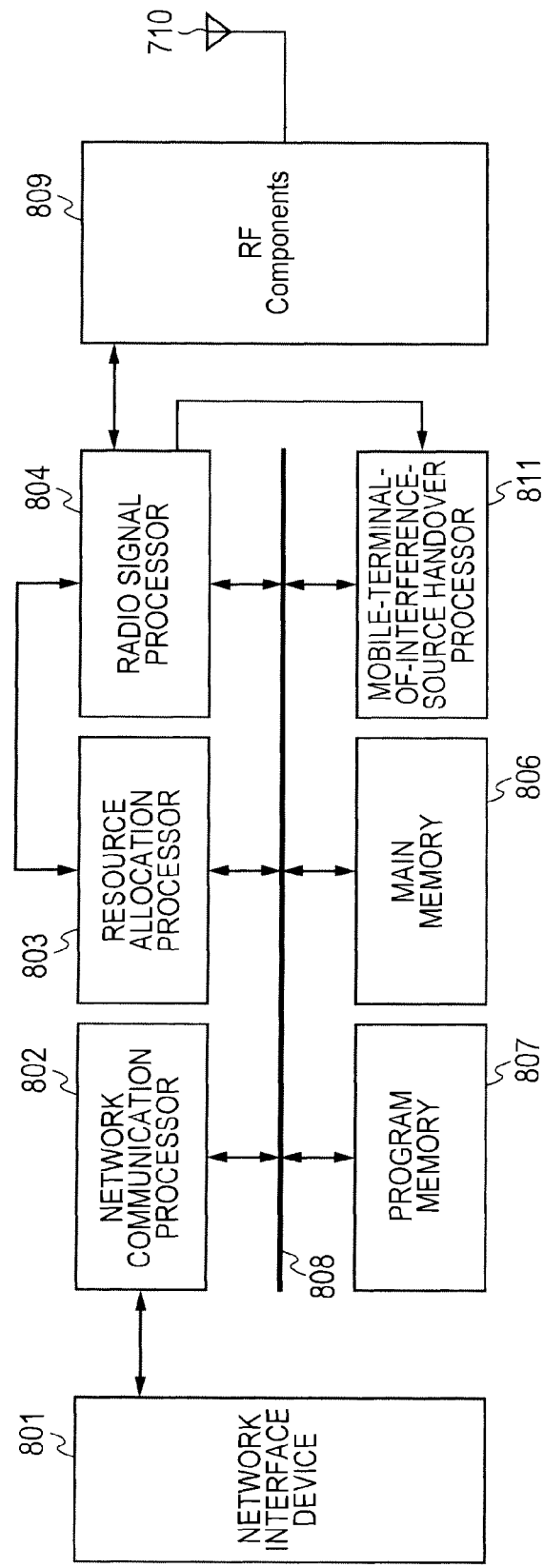
FIG. 17 is a configuration diagram of devices of the large coverage base station according to this embodiment.

FIG. 17 shows a device configuration of the large coverage base station according to this embodiment.

Each block shown in FIG. 16 can be performed by each device shown, for example, in FIG. 17. The large coverage base station has a mobile-terminal-of-interference-source handover processor 811 instead of the interference generation rule estimation processor 805 shown in FIG. 15. The mobile-terminal-of-interference-source handover processor 811 is a device for performing processings of, for example, the mobile-terminal-of-interference-source specifying processing part 721, the downlink received power acquisition processing part 722, and the handover control processing part 723, etc. shown in FIG. 16. Regarding other configurations, a correspondence between each device of FIG. 17 and each block of FIG. 16 is the same as that of the small coverage base station shown in FIG. 15 and FIG. 14.

According to this embodiment, it is possible to specify the mobile-terminal-of-interference-source based on the interference generation rule in the base station being interfered and the resource allocation log to the terminal in the neighbor base station, to reduce the uplink interference to a certain base station while suppressing communication between the base stations, and to stabilize the radio communication of the terminal connecting to the base station.

Second Embodiment

While in the first embodiment described above, the method for multicast transmitting the interference generation rule from the small coverage base station to the neighbor base stations was explained, in this embodiment, a method for multicast transmitting only a fact that the interference of high power occurred to the neighbor base stations will be explained.

The interference generation rule extraction processing performed in Step S1005 in the flowchart of the small coverage base station shown in FIG. 5 does not estimate the parameters shown by 404 to 407 of FIG. 8A and FIG. 8B, but only determines whether the interference of a large received power is detected in the interference measurement period, and if the interference is detected, will transmit the multicast message to the neighbor base stations. Incidentally, the extraction processing may be configured to, when the interference of a large received power is detected by the previously set number of times in an interference measuring time, communicate the multicast message. Since, at a point of time when this multicast message is received, the neighbor base station knows that a multicast information source base station receives the interference of a large received power, a field indicating that the interference has been detected does not need to be added to FIG. 8A and FIG. 8B. Moreover, since no interference generation rule needs to be notified, none of the fields of 403 to 408 in FIG. 8A and FIG. 8B need to be transmitted. Thus, in the second embodiment, it is possible to curtail a communication traffic volume necessary to transmit the multicast information.

The large coverage base station according to the second embodiment that received the multicast information needs to determine which terminal is handed over to the multicast information source base station. This determination is performed in Step S2002 of FIG. 9. Concretely, it judges the terminal that is inferred to be nearest to the multicast information source base station by referring to a downlink received power table shown in FIG. 12B. In FIG. 12B, the multicast information source base stations are searched in the vertical direction, the pertinent base station is searched in the horizontal direction, i.e., in a terminal direction, for a terminal whose downlink received power is a maximum, and the terminal found in the search is inferred as the mobile terminal of interference source. Subsequent processings are the same as those of the first embodiment, and if the downlink communication quality of the terminal is judged not to be sufficient in Step S2004, the handover of the terminal will not be performed.

Incidentally, each base station (the neighbor base station of the small coverage base station) that received the multicast information from the small coverage base station having detected an interference specifies a terminal by referring to the downlink received power table of the each base station as described above. Each of these terminals may also be designated as an object of the handover, and any one of the terminals may be designated as the object of the handover. For example, based on the downlink received power of the terminal specified as described above, the object of the handover may be chosen. For example, the following schemes can be taken: adjustment may be done among the above-mentioned neighbor base stations; the downlink received power of the terminal specified as described above may be transmitted to the small coverage base station, and the small coverage base station may chose the object of the handover; and if the downlink received power of the terminal specified as described above is less than or equal to the previously set threshold, the terminal may be excluded from the object of the handover.

Since this embodiment does not pay attention to a generation rule of the uplink interference occurring in the small coverage base station, the accuracy to specify the terminal that exerts an interference to the small coverage base station and belongs to the neighbor base station may deteriorate, but an effect of reducing an amount of the multicast information can be obtained.

Third Embodiment

In the first embodiment, although FIG. 14 and FIG. 16 describe the small coverage base station and the large coverage base station separately, they may be base stations each of which has both functions of FIG. 14 and FIG. 16. That is, there may be the small coverage base station having the function of the large coverage base station and the large coverage base station having the function of the small coverage base station. This may be done for an intention that even when all the base stations have the same downlink transmission power, if there are the base stations having both functions, the effect of this embodiment will be achieved. A person skilled in art will easily design the base station having functions of the both. Moreover, by making all the base stations have the same design, it is possible to curtail development costs, and as a result, to obtain a cost cut effect of the base station.

Fourth Embodiment

In the first embodiment, although the explanation was given on the premise that the Handover Request and its acknowledgement were directly transmitted not using the MME device 8 but through the backhaul network 6 between the base stations, the handover processing though the MME device 8 may be performed on portions described in Steps S2006, S2007, S2013, and S2014 of FIG. 9 following the operating sequence disclosed in 3GPP, "Evolved Universal Terrestrial Radio Access (E-UTRA) and Evolved Universal Terrestrial Radio Access Network (E-UTRAN); Overall description; Stage 2 (Release 10)," TS36.300, pp. 60-91, v 10.3.0, 2011/3. However, regarding the multicast information that the small coverage base station issues to the neighbor base stations according to the first embodiment, it shall be utilized not through the MME device 8 but by extending an X2 interface that is disclosed in 3GPP, "Evolved Universal Terrestrial Radio Access Network (E-UTRAN); X2 Application Protocol (X2AP) (Release 9)," TS36.423, pp. 12-17 and 27-32, v 9.1.0, 2009/12.

(Configuration Example)

This wireless communication system is, for example, a wireless communication system in which multiple base stations and one or more terminals exist, and each terminal connects with one base station and change the serving base station according to a communication state of the each terminal, i.e., performs a so-called handover, and is characterized in that information that urges the handover is multicast transmitted from the second base station other than the first base station to the multiple base stations except the second base station.

Moreover, the above-mentioned wireless communication system is characterized in that the one or multiple base stations excluding the second base station to which the multicast information is transmitted are the one or multiple base stations located in the neighborhood of the second base station.

Moreover, the above-mentioned wireless communication system is characterized in that a necessary condition to transmit the multicast information shall be a condition whereby the received power of the uplink signal exceeds a first threshold.

Moreover, the above-mentioned wireless communication system is characterized in that the second base station stores information of a time or a frequency or both of them at which the received power of the uplink signal exceeds the first threshold, estimates a generation rule of an uplink signal received power exceeding the first threshold from the record, and transmits the generation rule as the multicast information.

Moreover, the above-mentioned wireless communication system is characterized in that the base station that received the multicast information from the second base station specifies a terminal that is inferred to exert the interference of a strong power to the second base station among the terminals belonging to the base station, and performs the handover processing to the terminal.

Moreover, the above-mentioned wireless communication system is characterized in that specification of the terminal by the base station is performed based on either information of the multicast information and the downlink received power information that the base station collects from the belonging terminals or both information.

Moreover, the above-mentioned wireless communication system is characterized in one point that in specifying the terminal by the base station based on the multicast information, it collates the interference generation rule included in the multicast information and described in the fourth aspect of the invention and a log indicating that the base station itself allocated the uplink radio resource to the belonging terminal, and specifies a terminal having a past result of allocation of the uplink radio resource nearest to the interference generation rule.

Moreover, the above-mentioned wireless communication system is characterized in that in specifying the terminal by the base station based on the downlink received power information, it compares the downlink received power information about the second base station being a source of the multicast information between the terminals connecting to the base station, and specifies a terminal having a maximum downlink received power.

Moreover, the above-mentioned wireless communication system is characterized in that in the specification of the terminal by the base station based on the downlink received power information, only the terminal such that the downlink received power information about the second base station being a source of the multicast information exceeds the second threshold is designated as an object of the specification.

This base station apparatus is a base station apparatus that has, for example, a radio interface for performing radio communication with the terminal, a network interface for communicating with other base stations and a gateway, a downlink signal processing part and an uplink signal processing part that perform a radio signal processing between themselves and the terminal, respectively, and the neighbor list in which information on the neighbor base stations is listed, comprising: an interference power measurement part that inputs therein an uplink radio signal is inputted and measures an uplink signal received power density for each certain unit time and for each frequency, an interference generation rule estimation part that estimates a rule regarding a time or frequency or both of them at which the received power density exceeding the first threshold occurs from the received power density outputted from the interference power measurement part for each unit time and for each frequency, and outputs it as the interference generation rule information, and a multicast transmission part that creates a multicast message based on an output of the interference generation rule estimation part, decides a destination of the multicast based on the neighbor list, and transmits the multicast message.

Moreover, the above-mentioned base station apparatus is characterized by having the following two parts: a mobile-terminal-of-interference-source specifying part that receives the multicast message from an other base station apparatus, collates a record of the uplink communication resource that itself allocates to the terminal and the interference generation rule information included in the multicast message, and specifies a terminal that brings about the interference signal of a large received power to the source base station of the multicast message; and a handover processing part for performing the handover processing about the terminal that the mobile-terminal-of-interference-source specifying part specified.

The present invention is available to, for example, the wireless communication system where the base station whose output is large and the base station whose output is small exist together.

What is claimed is:

1. A wireless communication system that comprises a plurality of base stations including a first base station with which a terminal is configured to communicate and a second base station to which a radio signal transmitted from the terminal becomes an interference power, and is capable of performing handover of a connection destination of the terminal from the first base station to the second base station, wherein the second base station, upon detection of the interference power being more than or equal to a previously set threshold, is configured to multicast transmit information for urging the handover to multicast reception base stations that are at least a part of the base stations including the first base station, and wherein the multicast receiver base station having received the information is configured to specify a terminal that is inferred to exert the interference to the second base station that is a multicast source among the terminals connecting to the local base station and to perform a handover processing on the terminal; and wherein the multicast receiver base station is configured to specify a terminal that is inferred to exert the interference to the second base station based on downlink received power information of the terminal that the base station collects from the belonging terminal.

2. The wireless communication system according to claim 1, wherein the information that is multicast transmitted includes at least either of time information or frequency information at which an interference power being more than or equal to the previously set threshold is detected, and wherein specification of the terminal that is inferred to exert the interference to the second base station by the multicast receiver base station is done by specifying the terminal that transmitted the radio signal at a time and/or a frequency at which the interference power was detected based on the time information and/or frequency information included in the information that is multicast transmitted as described above.

3. The wireless communication system according to claim 2, wherein the multicast receiver base station is configured to manage a log of time and frequency at which the base station itself allocated an uplink radio resource to its belonging terminal, and to specify a terminal that transmitted the radio signal at a time and/or a frequency at which the interference power was detected by collating time information and/or frequency information included in the information that was multicast transmitted and a log saying that the uplink radio resource was allocated.

4. The wireless communication system according to claim 3,
- wherein the base station and the terminal are configured to communicate with each other using a subframe that was divided by a time and/or a frequency,
- wherein the second base station is configured to store either or both of time and frequency at which the received power of the radio signal transmitted from the terminal exceeds the threshold within a predetermined time, to estimate an interference generation rule that is a generation rule of an uplink signal received power that exceeds the threshold from the record, and to multicast transmit the information including the interference generation rule, and
- wherein the multicast receiver base station is configured to collate the received interference generation rule and a log saying that the base station itself allocated the uplink radio resource to the belonging terminal, and to specify a terminal having a past result of allocation of the uplink radio resource nearest to the interference generation rule.

5. The wireless communication system according to claim 4,
- wherein the interference generation rule has:
  - time information including a time period of a plurality of subframes at which the interference power was detected and an offset of a time at which the interference power was detected for the first time in the measurement period from a previously set reference time in a time direction; and
  - frequency information including an offset of a frequency at which the interference power was detected for the first time in the measurement period from a previously set reference frequency in a frequency direction and a shift quantity of frequency of a plurality of subframes at which the interference power was detected.

6. The wireless communication system according to claim 1,
- wherein the multicast receiver base station is configured to:
  - receive and store at least a notification of the downlink received power from the second base station at a belonging terminal of the local base station from the terminal,
  - compare the downlink received powers at respective terminals from the second base station that is a source of the information being multicast transmitted, and
  - specify one of the terminals such that the downlink received power exceeds the second threshold as the terminal that is inferred to exert the interference to the second base station.

7. The wireless communication system according to claim 6,
- wherein a terminal whose downlink received power is a maximum is specified to be the terminal that is inferred to exert the interference to the second base station.

8. The wireless communication system according to claim 1,
- wherein a terminal that was specified is handed over to the second base station of the multicast source.

9. The wireless communication system according to claim 1,
- wherein the multicast receiver base station is a single or a plurality of base stations adjacent to the second base station.

10. A base station in a wireless communication system that includes a first base station with which a terminal is configured to communicate and the base station to which a radio signal transmitted from the terminal becomes an interference power and is capable of handing over the first base station of the terminal, comprising:
- an interference power measurement part configured to input therein the radio signal transmitted from the terminal and to measure a received power density for each unit time and for each frequency that were previously determined;
- a multicast transmission part configured to specify a terminal that is inferred to exert the interference to the base station and to multicast transmit information for urging the handover to multicast receiver base stations that include the first base station and are at least a part of the base stations; and
- an interference generation rule inferring part configured to infer an interference generation rule that is a generation rule of the received power density being more than or equal to a previously set threshold based on a received power density for each unit time and for each frequency that is measured by the interference power measurement part,
- wherein the multicast transmission part is configured to multicast transmit the information including the inferred interference generation rule.

11. The base station according to claim 10, further comprising:
- a mobile-terminal-of-interference-source specifying part configured to receive information that is multicast transmitted from another base station having detected an interference power being more than or equal to a previously set threshold, and to specify a terminal that is inferred to exert the interference to the base station of the multicast source among the terminals connecting to the local base station; and
- a handover processing part configured to perform a handover processing about the terminal that the mobile-terminal-of-interference-source specifying part specified.

12. A base station in a wireless communication system that comprises a plurality of base stations including a first base station with which a terminal is configured to communicate and the base station to which a radio signal transmitted from the terminal becomes an interference power, and is capable of performing handover of a connection destination of the terminal, further comprising:
- a mobile-terminal-of-interference-source specifying part configured to receive information that is multicast transmitted from the base station having detected an interference power being more than or equal to a previously set threshold, and to specify a terminal that is inferred to exert the interference to the base station of the multicast source among the terminals connecting to the base station; and
- a handover processing part configured to perform a handover processing about the terminal specified by the mobile-terminal-of-interference-source specifying part;
- wherein the mobile-terminal-of-interference-source specifying part is configured to receive an interference generation rule that is based on the interference power detected by the base station and is multicast transmitted from the base station, to collate a log of an uplink communication resource that the base station allocated to the terminal and the interference generation rule, and to specify a terminal that is inferred to exert the interference power to the base station being a source of the multicast.

* * * * *